United States Patent
Luijten et al.

(12) 
(10) Patent No.: US 6,324,164 B1
(45) Date of Patent: Nov. 27, 2001

(54) ASYNCHRONOUS TRANSFER MODE (A.T.M.) PROTOCOL ADAPTER FOR A HIGH SPEED CELL SWITCHING SYSTEM

(75) Inventors: Ronald Luijten, Horgen (CH); Laurent Nicolas, Cary, NC (US); Michel Poret, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/018,591

(22) Filed: Feb. 4, 1998

(51) Int. Cl.$^7$ .................................................. H04L 12/56
(52) U.S. Cl. .......................... 370/230; 370/235; 370/392; 370/395; 370/399; 370/429; 370/465; 370/474
(58) Field of Search .................................. 370/230, 235, 370/389, 392, 395, 465, 471, 537, 542, 232, 252, 253, 397, 399, 409, 432, 474, 412, 413, 414, 428, 429

(56) References Cited

U.S. PATENT DOCUMENTS

| | | | |
|---|---|---|---|
| 5,941,952 | * | 8/1999 | Thomas et al. ................ 709/234 |
| 5,953,538 | * | 9/1999 | Duncan et al. ................. 710/22 |
| 6,072,798 | * | 6/2000 | Beasley ......................... 370/395 |

\* cited by examiner

*Primary Examiner*—Alpus H. Hsu
(74) *Attorney, Agent, or Firm*—Thomas A. Beck; Casey August

(57) ABSTRACT

An ATM protocol adapter designed to operate with high speed switching systems having a receive and transmit elements based upon pipeline structure insuring that each operation is performed in a limited period.

5 Claims, 17 Drawing Sheets

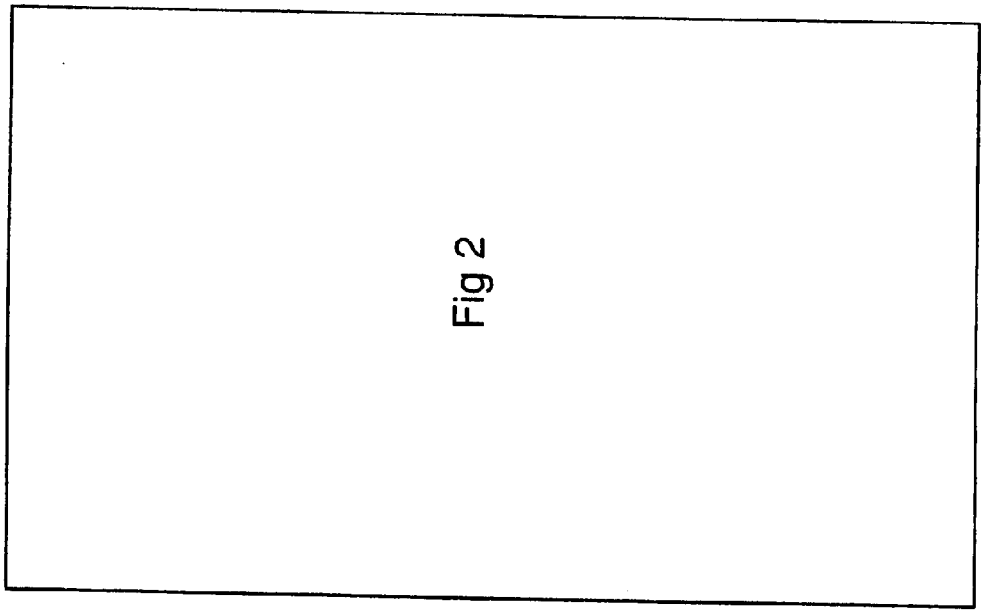
Fig 2
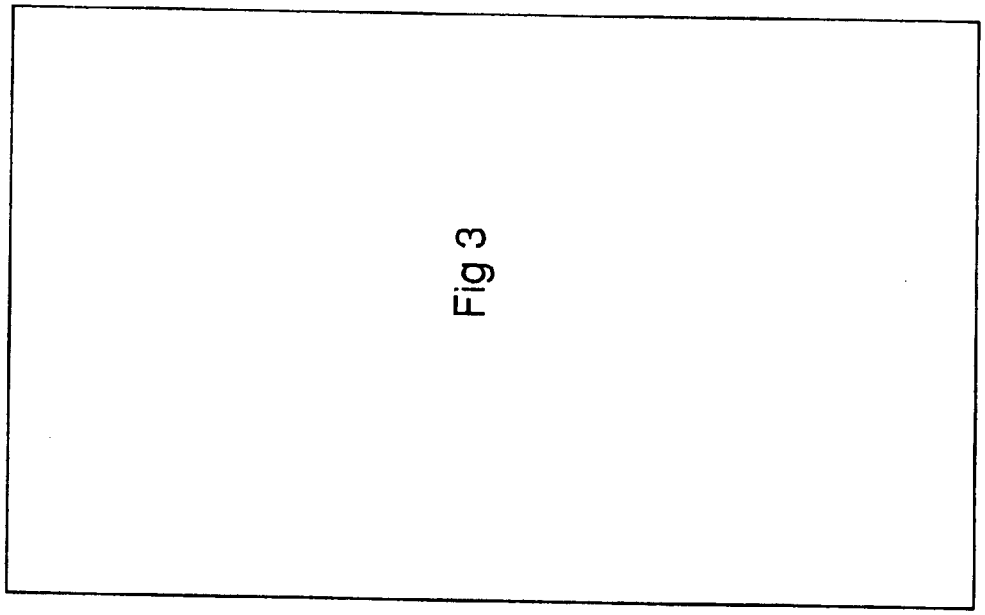
Fig 3
FIGURE 1

ASYNCHRONOUS TRANSFER MODE (A.T.M.) PROTOCOL ADAPTER FOR A HIGH SPEED CELL SWITCHING SYSTEM

TECHNICAL FIELD OF THE INVENTION

The invention relates to telecommunication and more particularly to an ATM Protocol Adapter designed to be operated in high speed cell switch.

BACKGROUND ART

The need for higher speeding system is increasing, particularly with the development of more sophisticated networks, multimedia applications and high speed communications.

The requirements are such that today 100 Gigabits switches will be more and more needed. Therefore, there is a need for particular protocol adapters that are well suited for operating in combination with high speed switches, even in wide multicasting mode; that is to say, when the cell is duplicated towards different output ports.

Asynchronous Transfer Mode (A.T.M.) Is an important state in the evolution of the digital telecommunications.

Prior art document "A Highly Modular Packet Switch for Gb/s Rates" by W. E. Denzel, A. P. J. Engbersen, I. Illiadis, G. Karlsson in XIV International Switching Symposium, October 1992, Vol. 2, page A8.3 ff. relates to a high-speed switching system.

SUMMARY OF THE INVENTION

It is an object of the present invention to provide an ATM Protocol Adapter that is particularly designed to operate with high speed switches, even when providing multicast capabilities.

This problem is solved by the Protocol Adapter, also called Protocol Engine, that has both a receive and transmit part based on a pipeline circuit, as defined herein.

An ATM Protocol Adapter for a high speed switching system comprising both a receive and transmit part based on pipeline structure ensuring that each operation is performed in a limited period. A particular arrangement of different tables provides the possibilities of performing the requirements technical operations on the cell in a limited period, thus permitting the use of the Protocol Adapter with high speed switching systems. More particularly, the receive part includes means (920) receiving the cell comprising a LI/VP/VC field, with LI defining from which line the cell entered into the Protocol Adapter, and VP/VC defining the ATM Virtual Path and Virtual Circuit assigned to the connection which the cell belongs. A first table (920) is accessed for providing an INPUT Index that is used for addressing a second table (922 returning the following parameters assigned to the considered LI/VP/VC; a CONNECTION Index; a REASSEMBLY Index; an OPERATION AND MAINTENANCE (OAM) Index; a CELL EXTRACT Index; a SWITCH ROUTING HEADER (S.R.H.) Index used for controlling both the routing process and multicast operations that will be executed into the switching system; and an OUTPUT Index characterizing a specific operation which is to be performed in the destination Protocol Adapter that will receive the cell after it is routed throughout the switching system.

Each element of the receive pipeline structure used part of its corresponding index to perform the appropriate processing task before the cell is forwarded and processed by the next element of the pipeline structure.

A POLICING BLOCK (925) uses the CONNECTION Index for addressing a third table (POLICY AND PARAMETERS COUNTERS table 936), that permits to check the conformance of the incoming cell to the Generic Cell Rate Algorithm (GCRA). Additionally, a AAL5 Block (930) uses the REASSEMBLY Index for determining whether the current cell should be reassembled in accordance with the AAL5 format or conversely forwarded to the next pipeline element without any reassembly. An OAM Block (935) uses the OAM Index for determining whether the received cell belongs to a connection for which a decision of OAM performance monitoring as specified in the 1.610 ITU Recommendation was made. A SWITCH HEADER INSERT Block (940) appends the SRH Index to the cell being processed by said receive pipeline circuit, which SRH Index will be used by the switching system for both controlling the routing and multicast operations therein performed. At last, the receive part comprises a VP/VO swap block (945) for inserting the OUTPUT Index within the cell in lieu of bits of said VP, and for further inserting a Header Correction Code (H.E.C.)

The invention also provides with a transmit part defined herein.

The arrangement of the receiver circuit in limited processing elements guarantees that the pipeline structure will be able to process the cells in a limited time, thus rending the Protocol Adapter well suited for high speed switching system.

DESCRIPTION OF THE DRAWINGS

FIG. 1 shows the arrangement of FIGS. 2 and 3 in order to provide a full and comprehensive illustration of the switching module 401 used for embodying the present invention.

DESCRIPTION OF THE PREFERRED EMBODIMENT OF THE PRESENT INVENTION

Figure 2:
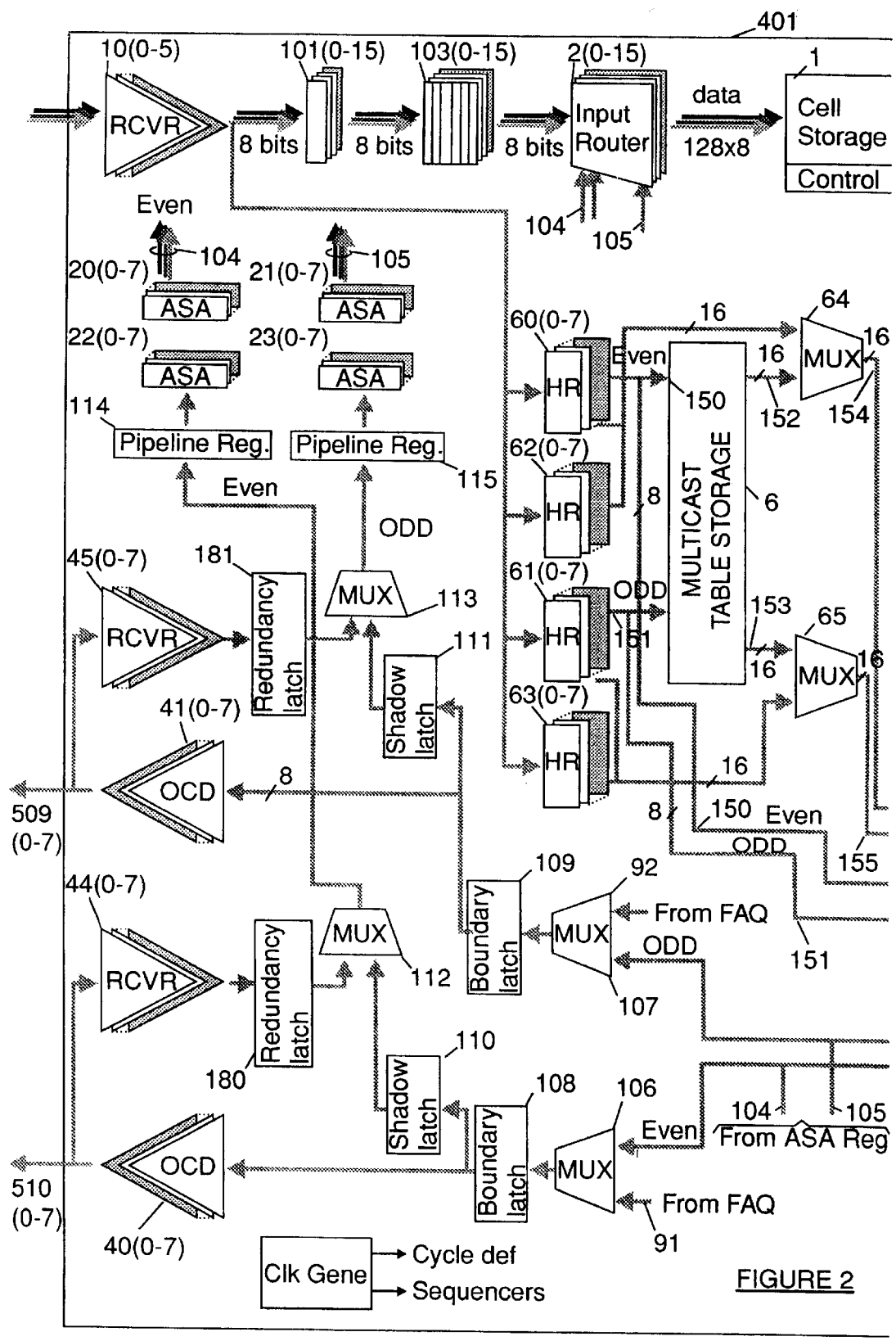
FIGS. 2 and 3 illustrate the structure of the switching module that is used in the preferred embodiment of the present invention.
Figure 3:
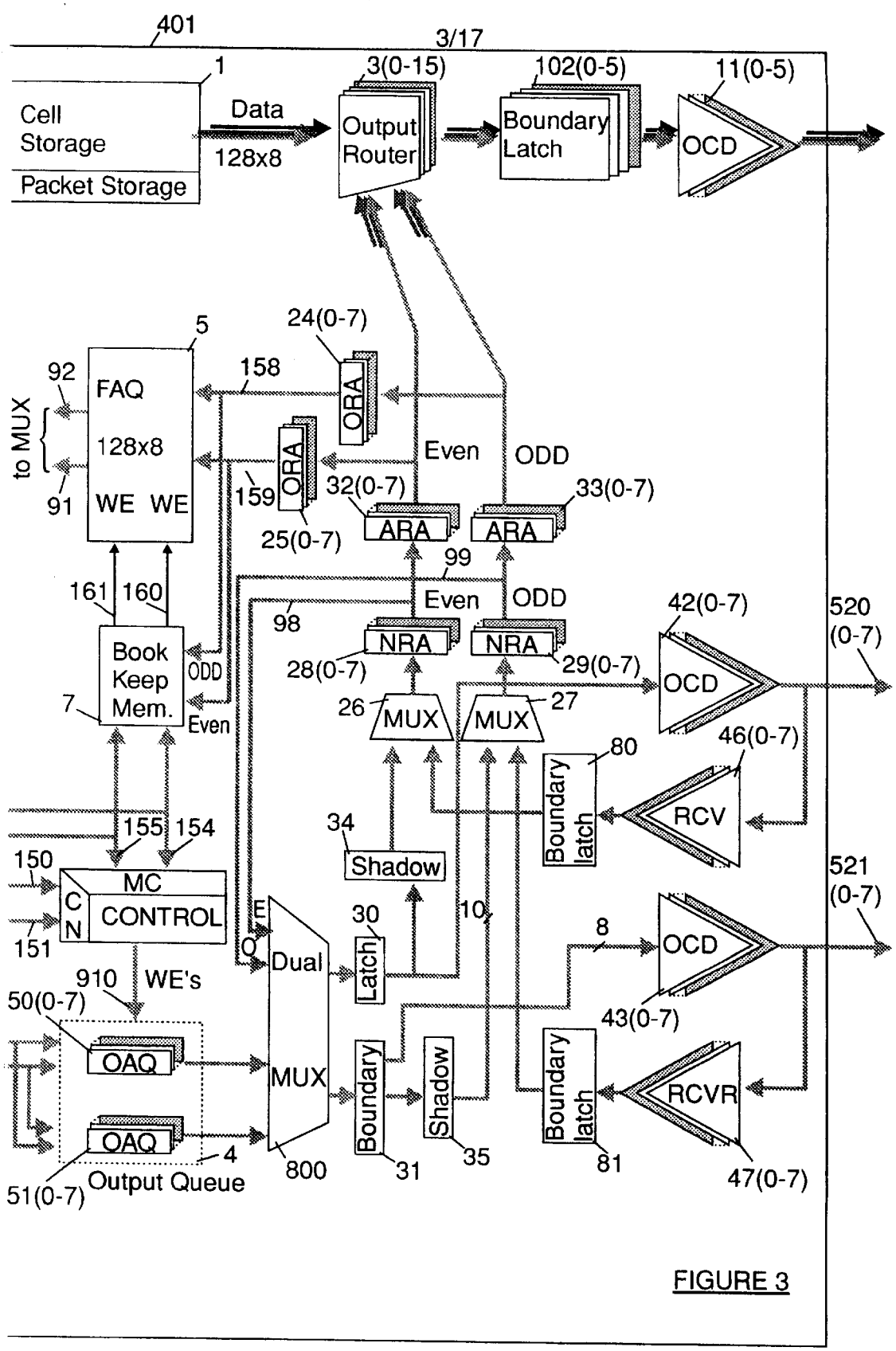

With respect to FIGS. 2 and 3, there is illustrated the switching module that is used for embodying the switching apparatus in accordance with the present invention. This module, represented in Block 401 includes a data section comprising a storage section for performing the storage process of the cells coming through any one of the sixteen input ports into a common Cell Storage 1, in addition to a retrieve section for outputting the cells therein loaded and for transporting them to any output port of the switching module.

The storage section uses a set of sixteen RCVR receivers 10-0 to 10-15 (receiver 10-15 being represented in dark in FIG. 2) which represents the physical interface for the sixteen different input ports. A set of sixteen corresponding routers 2-0 to 2-15 (router 2-15 being similarly represented in dark in FIG. 2) achieves the connection of the input ports to anyone of the 128 positions of Cell Storage 1. For timing considerations, the storage section further comprises a set of sixteen boundary latches 101-0 to 101-15 (latch 101-15 being represented in dark in the figure) and a set of pipeline circuits 103-0 to 103-15 so that the date that is transmitted by every receiver 10-i is conveyed to router 2-i via its corresponding boundary latch 101-i and pipeline 103-i. It will be understood that it can take any value from 0 to 15.

On the other side, the retrieve section of switching module 401 comprises a set of sixteen Off-Chip-Drivers (OCD) drivers 11-0 to 11-15 which are used for interfacing the sixteen output ports of the switching module. The OCD drivers receive the data from sixteen routers 3-0 to 3-15 via an associated set of sixteen boundary latches 102-0 to 102-15 (used for timing considerations) so that each router 3-i can retrieve any data located within the 128 locations that are available into Cell Storage 1, and can transport them via a corresponding OCD Driver 11-i towards the appropriate destination output port I.

In addition to the data section, switching module further comprises a control section that is based on a Free Access Queue (FAQ) circuit 5 (represented in FIG. 3) which is used for storing the addresses of the empty locations in Cell Storage 1. An Output Queue Memory 4, constituted by two distinctive sets of eight Output Address Queue (OAQ) 50-0 to 50-7 (Queue 50-7 being represented in dark in the figure) and 51-0 to 51-7 (the latter being illustrated in dark). As it will be explained hereinafter with greater detail, these two sets are used for storing the addresses of the location within Cell Storage 1 that contains the data cells that are to be transmitted to the output ports.

The two sets of eight registers; namely, ASA Registers 20-0 to 20-7 (register 20-7 being in dark) and ASA Registers 21-0 to 21-7 (the latter being in dark) are respectively used for generating addresses on a set of two busses—an ODD bus 104 and an EVEN bus 105—the two busses being connected to the sixteen Routers 2-0 to 2-15, and to OAQ Queue 4. Bus 104 is formed by the association of the eight output busses of ASA Registers 20-0 to 20-7 (composed of 64 bytes) while bus 105 is a 64 bytes bus that is constituted from the combination of the output busses of the eight ASA Registers 21-0 to 21-7.

Additionally, EVEN bus 104 is connected to a first input bus of a MUX multiplexor 106 receiving at a second input the free addresses from FAQ 5 via bus 91. The output of MUX 106 is connected to a boundary latch 108, the output of which being connected to the inputs of a set of eight Off Chip Drivers (OCD) 40-0 to 40-7 and to a shadow latch 110. OCD Drivers 40-0 to 40-7 have outputs which are respectively connected to form an 8-bit bus 510 (formed of the eight outputs 510-0 to 510-7), also connected to the output of corresponding RCVR receivers 44-0 to 44-7. The outputs of RCVR receivers 44-0 to 44-7 are connected to a redundancy latch 180, which output is connected to one input bus of a MUX multiplexor 112, the second input of which receives the contents of shadow latch 110. MUX multiplexor 112 has an output that is connected to a pipeline Register 114 in order to load the data there through conveyed into the appropriate NSA Registers 22-0 to 22-7 as will be described hereinafter.

Similarly, ODD bus 105 is connected to a first input bus of a MUX multiplexor 107 receiving at a second input the free addresses from FAQ 5 via bus 92. The output of MUX 106 is connected to a boundary latch 109, the output of which being connected to the inputs of a set of eight Off Chip Drivers (OCD) 41-0 to 41-7 and to a shadow latch 111. OCD Drivers 41-0 to 41-7 have their outputs 509-0 to 509-7 which are respectively assembled in order to form an 8-bit bus 509, also connected to the inputs of eight RCVR receivers 45-0 to 45-7. The outputs of RCVR which output is connected to one input bus of a MUX multiplexor latch 111. MUX multiplexor 113 has an output that is connected to a pipeline Register 115 so that the addresses can be made available to the appropriate NSA Registers 23-0 to 23-7 as will be described hereinafter.

The control section further comprises four sets of Holding Registers 60-0 to 60-7 (Register 60-7 being represented in dark); 61-0 to 61-7 (in dark); 62-0 to 62-7; and 63-0 to 63-7, that will be used for performing the switching process as will be described with greater detail.

Coming back to the data section again, it should be noticed that the sixteen input ports can simultaneously load sixteen cells into Cell Storage 1 at the addresses that are defined by the contents of two sets of eight ASA 20-0 to 20-7 registers and ASA 21-0 to 21-7. During the same time, sixteen cells can be extracted from Cell Storage 1 at the addresses that are defined by the contents of sixteen ARA registers, arranged in two sets of eight registers each: ARA registers 32-0 to 32-7 (Register 32-7 being in dark in the figure) and ARA registers 33-0 to 33-7 (in dark). ARA registers 32-0 to 32-7 receives the consents of corresponding NRA registers 28-0 to 28-7 through an EVEN bus 98 which is also connected to a first input of a dual-multiplexor circuit 800. Similarly, ARA registers 33-0 to 33-7 receives the contents of corresponding NRA registers 29-0 to 29-7 through an ODD bus 99 which is connected to a second input of dual-multiplexor circuit 800. Dual-multiplexor 800 respectively receives the output of the first and second set of OAQ queues 50-0 to 50-7 and 51-0 to 51-7 at a third and fourth input bus. Dual-Multiplexor has two output busses which are respectively connected to a boundary latch 30 and to a boundary latch 31.

NRA registers 28-0 to 28-7 are connected to receive the output of a MUX multiplexor circuit 26 which has a first and second input that respectively receives the contents of a shadow latch 34 and a boundary latch 80. Similarly, NRA registers 29-0 to 29-7 are connected to receive the output of a MUX multiplexor circuit 27 which has a first and second input that respectively receives the contents of a shadow latch 35 and a boundary latch 81. The output of latch 30 is connected to the input bus of shadow latch 34 and also to the inputs of a set of eight Off-Chip-Drivers (OCD) 42-0 to 42-7, which outputs 520-0 to 520-7 are assembled in order to form a bus 520 which also connected to the inputs of a set of eight RCV Receivers 46-0 to 46-7. Similarly, the output of latch 31 is connected to the input bus of shadow latch 35 and also to the inputs of a set of eight Off-Chip-Drivers (OCD) 43-0 to 43-7, which outputs 521-0 to 521-7, forming a bus 521, are connected to corresponding inputs of a set of eight RCVR Receivers 47-0 to 47-7. The outputs of RCVR Receivers 46-0 to 46-7 are connected to the input bus of latch 80, and the outputs of RCVR Receivers 47-0 to 47-7 are connected to the input bus of latch 81.

As will be described below, it will appear that the structure of the present invention permits a set of sixteen cells to be simultaneously extracted from Cell Storage 1, and routed to the appropriated output port.

Should one cell comprise N bytes (for instance 54 bytes), the switching module provides the possibility to store sixteen cells into Cell Storage 1 and to retrieve sixteen cells from Cell Storage 1 in a set of N clock cycles.

Below will now be described with more detail the Input and Output processes that are involved in the switching module 401.

1. Input Process

The input process is involved for achieving the complete storage of a set of N bytes comprising one elementary cell (considering that sixteen cells are actually being inputted simultaneously). The input process basically involves two distinctive operations: firstly, the cells are entered into the data section via the sixteen receivers 10-0 to 10-15 as will be described below. This first step is achieved in a set of N clock cycles. Additionally, a second operation is performed for preparing the addresses within Cell Storage 1; or more exactly, for computing the sixteen addresses that will be used within Cell Storage for the loading of the next set of sixteen cells that will follow. In the preferred embodiment of the invention, this second address computing step is achieved in a set of eight elementary cycles only. Indeed, the first cycle is used for computing the addresses used by input port 0 and 1, while the second achieves the determination of the addresses that will be needed by ports 2 and 3; and more generally, cycle n provides the computing of the two addresses within Cell Storage 1 that will be involved for inputting the cell coming through ports 2n and 2n+1.

In order to prepare the input operation, the free addresses of the Cell Storage 1 are provided by Free Address Queue 5 and loaded into the first set of ASA registers 20-0 to 21-7, and second set of ASA registers 21-0 to 21-7. For the sake of conciseness, when the ASA registers 20-0 to 20-7 are considered without any distinction, there will be used a single reference to "ASA registers 20". Similarly, the use of the reference to "ASA registers 21" will stand for the use of the eight ASA registers 21-0 to 21-8 indistinctly. When a distinction will have to be introduced, the normal reference to the registers 20-0 to 20-7 (or a reference to register 20-i) will be reestablished. This simplification will also be used in the remaining part of the description for the other groups of seven or fifteen individual elements, such as ARA registers 32-0 to 32-7, NRA registers 28-0 to 28-7, etc . . .

Now it will be described the full loading of the ASA registers 20 and 21. As mentioned above, this is achieved by eight successive transfers of the addresses provided by FAQ circuit 5, via multiplexor 106, boundary latch 108, shadow latch 110, multiplexor 112, pipeline register 114 and multiplexor 112. For instance, the loading of 20-0 is achieved by a transfer of the address provided by FAQ circuit 5 (on bus 91), via multiplexor 106, latches 108 and 110, multiplexor 112, pipeline register 114 and NSA register 22-0. Then, ASA register 20-1 is loaded by a similar transfer via its corresponding NSA register 22-1, etc . . . Similarly, the loading of the set of ASA registers 21 is successively carried out via the multiplexor 107, boundary latch 109, shadow latch 111, multiplexor 113, pipeline register 115, and the set of eight NSA registers 23.

As mentioned above, multiplexors 106 and 107 have a second input which is connected to respectively receive the contents of the ASA registers 20 and 21. The use of the second input of multiplexors 106 and 107 allows the recycling of the addresses that are loaded into the ASA registers 20 and 21 (for instance ASA register 20-i when the transfer is being performed during cycle i among the eight elementary cycles). It should also be noticed that the two sets of ASA registers form a whole group of sixteen registers that will be associated to the sixteen input ports of the switch module. The invention takes advantage of the arrangement of the set of ASA registers 20 and 21 in two groups of eight registers each in order to reduce the number of elementary cycles that are required for computing the sixteen addresses used for the loading of the sixteen cells into Cell Storage 1. With only eight successive cycles, the invention provides the possibility of handling sixteen different input ports.

When the free addresses are loaded into ASA registers 20 and 21, the cell cycle which achieves the actual loading of the N-bytes cell into Cell Storage 1 can be initiated. Indeed, it appears that, for each input port, an address is made available into a corresponding one of the set of sixteen ASA registers. More particularly, the cell that is presented at an input port number 2n (that is to say even since n is an integer between 0 to 7) will be loaded into Cell Storage 1 through the corresponding router 2-(2n) at a location which address is defined by the contents of ASA register 20-n. The cell that is presented at an input port being odd, that is to say number 2n+1 (with n being an integer between 0 and 7) will be loaded into Cell Storage 1 through router 2(2n+1) at a location that is defined by the contents of ASA register 21-n. From this arrangement, it appears that the complete storage of a full cell of N elementary bytes requires a set of N elementary clock period, while the control section allowing the storage of the ASA registers 20 and 21 requires eight elementary cycles. However, it should be noticed that since each router 2 is associated to a corresponding one among the sixteen ASA registers 20 and 21, sixteen cells can be simultaneously loaded into Cell Storage 1. More particularly, router 2-(2n) receives the output bus of the ASA register 20-n, while router 2-(2n+1) receives the output bus of ASA register 21-n.

It will now be described how the routing process of the incoming cell is being performed simultaneously with the above mentioned loading of the ASA registers 20 and 21. In the preferred embodiment of the invention, this routing process is based on a use of a routing header that can be of one or two bytes.

When the header is limited to a single byte, the switch module according to the present invention operates differently in accordance with the Most Significant Bit (MSB) of the header. Indeed, as it will be explained below, the switch is designed to operate in an unicast mode when the MSB of the one-byte routing header is set to zero, while it operates in a multicast mode when the MSB is fixed to a one.

In unicast mode, the header is defined to the following format:

| bit 0 | ! bit 1 | bit 2         | bit 3 | !bit 4 | bit 5 | bit'6 | bit 7! |
|-------|---------|---------------|-------|--------|-------|-------|--------|
| 0     | !       | module number | !     | port number |  |       | !      |

With the module number defining the accurate module that will route the cell. The port number defines the identification of the port to which the cell must be routed.

Conversely, when the MSB is fixed to a one—characteristic of the one-byte multicast mode—the seven remaining bits of the one-byte header are used as a multicast label which is used to determine the output ports to which the cell must be duplicated, as will be shown hereinafter.

In addition to the one-byte header, the switching module of the present invention is also designed to operate with a two-byte header. In this case, the sixteen bits of the latter are used to define the output ports where the cell will be duplicated. Indeed, each bit of the sixteen bits of the header is associated to one output port—for instance, the MSB corresponding to output port number 0—and every bit of the header that is set to a one indicates that the cell carrying this header will have to be duplicated to the output port that is associated to the considered bit. For instance, the MSB being set to "one" will cause the cell to be duplicated to output port 0, while bit number one set to a one will result in the same duplication to output port number 1, etc . . .

With these possibilities of use of difference format of headers, resulting in different modes, the switching module is allowed a great flexibility, only requiring adaptations of the micro code that is loaded into the switching module.

It will now be described with more detail the unicast one-byte-header mode (so called the "Unicast Mode"; section 1.1), the multicast one-byte-header mode (so called the "integrated multicast mode"; section 1.2) and then the two-bytes header mode (so called the "bit-map" mode; section 1.3).

Section 1.1: Description of the Unicast Mode (Unicast One-byte Header Mode)

The unicast mode is based on the use of the two sets of Holding Registers 60 and 61, forming a whole set of sixteen Holding Registers. Simultaneously, with the loading of the sixteen cells (formed of N bytes each), the one-byte header of each cell is loaded into the corresponding one among the sixteen Holding Registers 60 and 61 mentioned above. These sixteen Holding Registers (namely, registers 60-0 to 60-7 and 61-0 to 61-7) hold the header as long as the entire loading process of the cells is not fully completed. In the arrangement of the present invention, the header of the cell that comes through port 2n is being loaded into Holding Register 60(n), while the header of the cell coming through port 2n+1 is loaded into Holding Register 61(n). The sixteen values that are loaded into these sixteen Holding Registers will be used by the control section of the switching module.

As it appears in FIGS. 2 and 3, each Holding Register 60-i is connected via an EVEN bus 150 to a control module 200; as well as, to a Multicast Table Storage 6. Similarly, each Holding Register 61-i is connected via an ODD bus 151 to control module 200 and to Multicast Table Storage 6. Similarly, to the loading process of the ASA registers 20 and 21 that was described above, the access of the sixteen Holding Registers 60 and 61 are achieved by eight successive elementary clock periods, each clock period providing the access of a dual ODD-EVEN Holding Register to bus 150 and 151. More particularly, during clock period number 0 for instance, Holding Registers 60(0) and 61(0), respectively, get the access to EVEN bus 150 and ODD bus 151 in order to transfer their contents into Control Module 200. At the next clock period, the busses 150 and 151 are used for transporting the contents of the Holding Registers 60(1) and 61(1), and so on . . .

It should be noticed that the access of Holding Register 60(i) and 61(i) to control Module 200 particularly permits the monitoring of the MSB of the header of each cell being inputted into the switching module. This particularly permits Control Module to be aware of the accurate mode of the operation—either unicast or integrated multicast—that will be associated to each input port. For instance, should the header being loaded into Holding Register 60(i) carry a MSB set to zero—indicative of the unicast mode of operation—then the Control Module 200 will determine that the considered input port 2n will require a unicast processing. Conversely, if the MSB of Holding register 61(i) carries a one—characteristic of the integrated multicast—then the Control Module 200 will cause the cell being associated to be processed according to the integrated multicast mode that will be described below.

The Unicast Routing Process Operates as Follows

Output Queue is formed of the sets 50 and 51 of eight queues each. Each individual OAQ queue of sets 50 and 51 is a dual input port of 64 bytes at least that is connected to EVEN bus 104 and ODD bus 105, Additionaly each OAQ queue receives an ODD Write-Enable and an EVEN Write-Enable control signals from control module 200, The sixteen sets of ODD and EVEN Write-Enable control leads form a 32-lead bus 210. Similarly to the notation that was already employed above, each OAQ queue is associated to a corresponding one of the sixteen output ports of the switching module, Therefore, Output port number 2n will be associated to OAQ queue 50(n), while Output port 2n+1 corresponds to OAQ queue 51(n).

At a given instant (referred to as cycle n), the two input ports 2n and 2n+1 are processed as follows: Control Circuit 200 gets the access of the contents of Holding Registers 60(n) via bus 150 (i.e. the header of the cell on input port 2n) and the contents of Holding Register 61(n) (i.e. the header of cell received at input port 2n+1) via bus 151, Control Module uses these headers for generating the appropriate ODD and EVEN Write-Enable control signals so that the contents of the ASA registers 20(n) and 21(n) is loaded into one or two of the sixteen OAQ queues 50 and 51. More particularly, it should be noticed that Control Module generates the Write-Enable control signals on bus 210 so that the contents of the ASA register 20(n) is loaded into one of the sixteen OAQ queues 50 and 51 that corresponds to the output port that can be determined from the contents of the header being transported and loaded into Holding Register 60(n), in accordance with the Port Number field that is defined by bits 4 to 7 of the one-byte header.

Simultaneously, the contents of ASA register 21(n) is loaded into one of the sixteen output queues 50 and 51 that corresponds to the output port that can be determined from the contents of the header being loaded into Holding Register 61(n), particularly bits 4 to 7 of the latter.

More precisely, considering the input port 2n, should the contents of Holding Register 60(n) be equal to an integer 2p, the contents of ASA register 20(n) will be loaded into Output Queue 50(p). This will result, as will be described below, in the cell being received in input port 2n to be routed to the output port number 2p in accordance with the contents of the routing header being transported by the cell.

Should the contents of Holding Register 60(n) be equal to integer 2p+1i Control Module 200 generates the appropriate Write-Enable control signals on bus 210 so that the contents of ASA register 20(n) is loaded into OAQ 51(p), causing the cell that is received at input port 2n to be routed to output port 2p+1.

Similarly, considering now input port 2n+1, should the contents of Holding Register 61(n) be equal to integer 2q, the contents of ASA register 21(n) will be loaded into Output Queue 50(q) (so that the cell will be transported to output port 2q). However, should the contents of Holding Register 61(n) be equal to 2q+1, then Control Module 200 generates the appropriate Write-Enable control signals so that the contents of ASA register 21(n) is loaded into Output Queue 51(q), so that the cell will be routed to output port 2q+1.

It may well occur that the two cells coming at input ports 2n and 2n+1, and which are loaded into Storage 1, are to be directed to a same output port, for instance output port 2p (resp. 2p+1) accordingly, with the header being transported by the two cells. In this case, it appears that both Holding Registers 60(n) and 61(n) carry the same header. What results is the contents of the ASA register 20(n) and 21(n) is loaded into unique Output Queue 50(p) (resp. 51(p)),@In the invention, this type of contention is advantageously solved by using a Dual-Port Storage for embodying each one of the sixteen output queues 50 and 51.

1.2 Description of the One-byte-header Multicast Mode (Integrated Multicast)

The integrated multicast mode is based on the use of the two sets of Holding Registers 60, and 61, forming a total of 16 registers.

As above, the header of the cell coming at input port 2n is loaded into Holding Register 60(n), while that of the cell coming at input port 2n+1 is loaded into Holding Register 61(n). The loading of the sixteen Holding Registers 60 and 61 requires eight clock period, as above, since two registers can be simultaneously loaded.

As mentioned above, by monitoring the MSB of the one-byte header that is incorporated into each cell, the Control Module 200 is made aware of the appropriate processing—unicast or integrated multicast—that has to be performed to every cell coming at one input port.

The Integrated Multicast Routing Process Operates as Follows

As above, the sixteen dual-port Output queues 50 and 51 of OAQ queue 4 is arranged so that output port 2n is being associated to queue 50(n) and output port 2n+1 is being associated to queue 51(n).

At a given instant, during cycle n, the two input ports 2n and 2n+1 are processed as follows:

The 7 Low Significant Bits (LSB) of the two headers that are respectively loaded into Holding Register 60(n) and 61(n)—which correspond to the multicast label as mentioned above—are simultaneously used for addressing Multicast Table Storage 6 via busses 150 and 151. This entails the execution of simultaneous reading operation of the dual-port memory used for embodying the Multicast Table Storage 6. Multicast Table Storage 6 presents two 16-bit data busses 152 and 153 which are respectively connected to a first 16-bit input bus of a multiplexor 64 and to a first 16-bit input bus of a multiplexor 65. Multiplexor 64 (resp. 65) has a second input bus that is respectively connected to receive the contents of the two 8-bit Holding Registers 60(n) and 62(n) (resp. Holding Register 61(n) and 63(n)). The use of this second input bus of Multiplexors 64 and 65 will be further explained with respect to the above description of the bit-map multicast mode. Multiplexors 64 and 65 have an 16-bit output bus that are respectively connected to a dedicated part (so called MultiCast or MC) of Control Module 200.

The results of the two simultaneous reading operations of Storage 6 is presented to control module 200 via multiplexors 64 and 65, respectively. It should be noticed that the control of all the multiplexors that are used in the switching module of the present invention is achieved by means of a general control device such as a general microprocessor (not shown in the figure). Therefore, for the input ports which are identified by Control Module 200 as requiring the integrated multicast processing, the latter uses the contents of the Multicast tables that are passed through multiplexors 64 and 65 via busses 154 and 155, respectively, to generate the appropriate Write-Enable control signals on bus 210 so that the contents of the ASA registers 20(n) and 21(n) are loaded into the appropriate queues 50 and 51 that corresponds to the output ports involved for the multicast operation.

This is Achieved as Follows

According to the multicast label that is carried by the header of input port 2n, loaded into Holding Register 60(n), the result of the reading operation performed in Multicast Table Storage 6 provides a 16-bit word that is presented on bus 152. Each of the sixteen bits forming this word is associated to one output port of the switching module. For instance, the MSB is affected to correspond to the output port number 0 that is associated to OCD driver ll(O), while the LSB corresponds to the output port 15. Therefore, the sixteen bits of the word presented on bus 152 define the different output ports to which the cell carrying the considered one-byte header will have to be duplicated. Should the cell be duplicated in the EVEN output ports (ie port 0, 2, 4, . . . , 14), then the word will be XIAAAA (in hexadecimal). Should the cell be duplicated in all output ports—corresponding to a so-called broadcast multicast—then the word will be X'FFFF.

More generally, Control Module 200 generates the Write-Enable control signals on bus 210 so that the contents of ASA register 20(n) is loaded into the group of appropriate queues among the sixteen output queues 50 and 51 of block 4 that corresponds to one output port which is determined by the word transported on bus 152. Simultaneously, the contents of register 21(n) is loaded into the group among the sixteen output queues of OAQ block 4 that corresponds to the output port determined by the value carried by bus 155. More precisely, during cycle n, considering the bit number 2p of bus 154, if the latter appears to be set to a "ONE", this will cause the contents of ASA Register 20(n) (corresponding to input port 2n) to be loaded into output queue 50(p). This will result in the duplication of the cell on to output port 2p, Considering now bit number 2p+1 of bus 154 during the same cycle n, if the latter is set to a "ONE", this will be intepreted by Control Module 200 as a need for loading the contents of ASA register 20(n) (still corresponding to input port 2n) to be transferred into OAQ output queue 51 (p). This will result in the duplication of the cell incoming in input port 2n at output port 2p+1. This mechanism permits the duplication of one cell (incoming in input port 2n in the considered example) at any combination of the output ports, Considering cycle n again, and bit number 2q of bus 155, if the latter is set to a one, this will result in Control Module 200 causing the contents of ASA register 21(n) (corresponding to input port 2n+1) to be transferred into output queue 50(q). As above, this will result in the duplication of the cell arriving at input port 2n+1 to the output port 2q. Similarly, if the bit number 2q+1 of bus 155 is set to a one during cycle n, the contents of ASA register 21(n) will be loaded into output queue 51(q), resulting in the duplication of the cell at the output port 2q+1.

It appears from the above described mechanism that it could well occur that the two cells that arrive at input ports 2n and 2n+1 contain a header that corresponding each to a broadcast operation. In which case, the duplication of the cells are requested for all the output ports. In this very particular case, during cycle n of the eight clock periods needed for processing the sixteen ports, the two busses 154 and 155 appear to convey the same information, i.e. XIFFFF (in hexadecimal), Control Module 200 simultaneously generate the 32 Write-Enable control signals on bus 210, thus causing the loading of the contents of the two ASA registers 20(n) and 21(n) processed during cycle n into the sixteen OAQ output queues 50 and 51. Since these queues are embodied by means of a dual-port storage, it appears that any contention is advantageously solved.

Next, a specific operation is involved for preparing the output process associated with the two addresses which were transferred from ASA registers 20(n) and 21(n). This mechanism involves the use of the Book Keep Memory circuit 7. Indeed, during cycle n, the address defined by the contents of the ASA Register 20(n), presented on bus 104, is used as an address for addressing the Book Keep Memory 7 and for therein storing the actual number of times that the considered address in ASA 20(n) was stored into Output Queue 41 that is to say the number of duplications which must be performed for the considered cell being loaded into Cell Storage 1. More particularly, for a unicast operation, the value which is loaded into Book Keep Memory 7 at the address defined by the contents of ASA register 20(n), will be equal to 1. In the case of a multicast operation on the cell arriving on port 2n, the value which is loaded will represent the number of 1 existing on bus 154, that is to say the number of times that the cell will be duplicated on the output ports.

Simultaneously, the address that is loaded into ASA Register 21(n), during cycle n, is processed in the same way. Therefore, for an unicast operation on input port 2n+1, the value which is loaded into Book Keep Memory 7 at the address defined by the contents of ASA register 21(n) will be equal to 1, while, in a multicast operation, that value will be equal to the actual number of 1 that exists on bus 155.

1.3 Description of the Two-bytes Header Multicast Mode (Bit Map Mode)

In the bit map mode, the multiplexors 64 and 65 are switched at their alternate position, contrary to the one-byte header mode (thanks to some internal control device not shown on the figure). Therefore, it appears that the data can be directly transferred from bus 156 to bus 154; and similarly, data that appears on bus 157 can be directly transferred to bus 155. The bit-map mode is based on the use of Holding Registers 60, 61, 62 and 63, thus forming a whole set of 32 registers of eight bits each.

The two-bytes-header of the cell that comes through input port 2n is loaded into Holding Register 60(n) and 62(n), while the header of the cell arriving at input port 2n+1 is loaded into Holding Register 61(n) and 63(n). The full loading of the 32 Holding Registers requires a set of eight successive cycles. In the bit map mode, the Multicast Table 6, busses 150, 151, 152 and 153 are not used. Further, an initialization period is involved for setting the control module 200 into this bit map mode, so that the latter can then use the 16-bit words that are presented on busses 154 and 155—and respectively coinciding with the two-bytes headers of the cells arriving at input port 2n and 2n+1—for generating the appropriate Write-Enable control signals on bus 210. This results in the contents of ASA registers 20(n) and 21(n) be loaded into the appropriate queues 50 and 51 that corresponds to the accurate output ports involved for the multicast operation, as described above for the integrated multicast mode in section 1,2.

In the particular case where an unicast operation is to be performed on one cell arriving at input port 2n, it should be noticed that the two-byte header will have one unique "1", which location among the sixteen bits accurately will accurately define the target output port where the cell will be routed.

At last, the Book Keep memory is similarly processed as above, for the purpose of preparing the output process that will use the particular addresses that were loaded into ASA registers 20(n) and 21(n).

Description of the Output Process with More Detail

2. Description of the Output Process Performed by the Switching Module

The output process is independent from the input process and involves two distinctive phases:

A first preliminary phase is first initiated, which requires a succession of 8 successive cycles. During cycle n, there is simultaneously prepared the operation for the output ports 2n and 2n+1. The first phase allows the loading of the sixteen ARA Register 32 and 33.

This is achieved as follows:

During cycle n the address loaded into Output Address Queue 50(n) is extracted and transported to NRA Register 28(n) via boundary latch 30, shadow Register 34 and Multiplexor 26 (controlled by internal processor not shown in the figure), Simultaneously, the address that is loaded into Output Address Queue 51(n) is extracted and conveyed to NRA Register 29(n) via boundary latch 31, shadow Register 35 and Multiplexor 27. It therefore appears that the loading of the sixteen NRA Registers 28 and 29 requires a set of eight elementary clock cycles. When these eight cycles are completed, then the contents of each NRA Register among the sixteen ones 28 and 29 is simultaneously loaded into the corresponding one among the sixteen ARA Registers 32 and 33. This loading completes the first initialization phase.

The second phase can then be initiated:

The sixteen addresses which are now available into ARA Registers 32 and 33 are presented to their corresponding Output Routers 3-0 to 3-15,. Each Router will then perform the appropriate connection of its corresponding output port to one among the 128 locations within Cell Storage 1 that is designated by the address defined by the contents of the corresponding ARA Register 32 or 33. More particularly, each Router 3(2p), with p=0 to 7, performs the connection of output port 2p to the appropriate location within Cell Storage 2 that is defined by the contents of ARA Register 32(p). Simultaneously, every Router 3(2p+1)., with p=0 to 7, performs the connection of output port 2p+1 to the appropriate location in Storage 1 that is designated by the contents of ARA Register 33(p). Therefore, it appears that the sixteen Retrieve operations can be simultaneously performed and sixteen cells can be routed towards the sixteen OCD drivers 11, allowing a very effective switching mechanism. It should be noticed that the full extraction of the cells require a number of N clock periods.

At the completion of the output process, the sixteen addresses that are contained in the ARA Registers are transferred into corresponding locations of a set of sixteen Old Retrieve Address (ORA) registers 24 (0) to 24 (7) and 25 (0) to 25 (7). This is achieved by a single transfer of the contents of ARA Register 32(n) and 33(n) into ORA Register 24(n) and 25(n).

It should be noticed that in the preferred embodiment of the present invention, the dual transfer of the contents of NRA Registers 28(n) and 29(n) into the corresponding ARA Registers 32(n) and 33(n) are simultaneously achieved with the dual transfer of the contents of ARA Registers 32(n) and 33(n) into ORA registers 24(n) and 25(n).

The process then proceeds to a recycling of the addresses of Cell Storage 1 which becomes available again because of the possible extraction of the cells which were therein loaded. This process uses the Book Keep Memory 7 in order to take into account the possibility of multiple booking when in multicast mode. Indeed, in the case of multicast cells, the invention prevents that the first retrieve operation performed on this cell results in the availability of the considered location into Cell storage 1 until the last duplication of the cell can be actually completed. Also, the process used in the present invention takes into consideration the fact that, should a cell be duplicated three times at three distinctive output ports for instance, the three retrieve processes might well not occur at the same instant for each output port. The difference in the actual retrieve operation of the same cell obviously depends upon the actual loading of the OAQ queue that corresponds to the output port being considered, that is to say, the actual traffic of the output port.

The recycling process requires a set of eight elementary cycles performed as follows: During cycle n, the contents of ORA Register 24(n) is presented via bus 158 to the Free Address Queue (FAQ) circuit 5 and to the Book Keep Memory circuit 7. For the address which is considered, and defined by the value carried by bus 158, Book Keep Memory 7 provides the number of remaining reservations, that is to say the number of times the cell stored in the considered location should be still retrieved. This number is then reduced by one and a test is performed on the result. If the result is not equal to zero, the latter is loaded again into the storage of Book Keep Memory circuit 7 at the same address. However, if the result of the decrementation appears to be equal to zero—indicating that the retrieve operation corresponds to the last duplication that was requested by the header—this result is also reloaded into the internal storage of Book Keep Memory circuit 7, at the same address, and, additionally, circuit 7 generates a Write-Enable control signal on lead 160 in order to load the address existing on bus 158 into the internal storage of FAQ circuit 5. The latter is therefore registered as an available location of further cell storage operations.

The same process is simultaneously performed for the value of the address that is stored into ORA register 25(n) which is presented via bus 159 to the input bus of both FAQ circuit 5 and to the Book Keep Memory circuit 7. Similarly, as above, if the result of the decrementation by one which is performed on the value being loaded into circuit 7 at the address carried by bus 159 appears to be equal to zero, then circuit 7 generates a Write-Enable control signal on lead 161 to FAQ circuit 5 so as to load the considered address into the internal storage of the FAQ circuit 5. When this is completed, the considered address is made available again for further cell storage operations, as described in section 1 relating to the input process.

It should be noticed that the invention takes great advantage of the use of Dual-Port storage for embodying the internal storage of the two circuits 5 and 7. Indeed, this particularly allows the possibility to reduce by two the number of cycles which are necessary for processing the different addresses within Cell Storage 1. In the invention, only 8 elementary cycles are required for providing a 16-input and 16 output port switching module.

Figure 4:
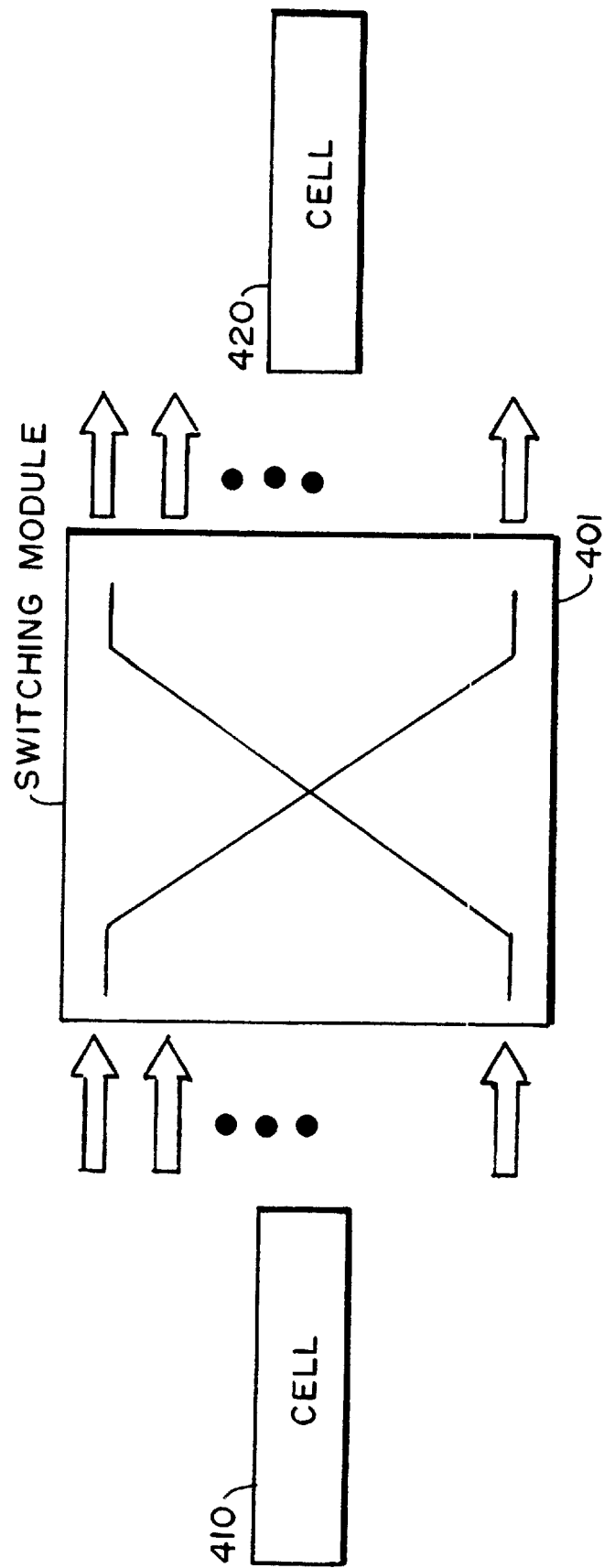
FIG. 4 illustrates the use of a single switching module for carrying out a switching apparatus.

FIG. 4 illustrates the use of a single switching module 401 of the present invention in order to provide a switching apparatus. As shown in the figure, a particular cell 410 is received by the switching module 401 and routed in accordance with the routing process that was described above. The cell represented with reference to arrow 420—is made available at the appropriate output port of module 401. In this figure, the switching apparatus, that will hereinafter called the switch fabric, is based of one single module 401 and operates at a speed which is basically fixed by a given technology.

Figure 5:
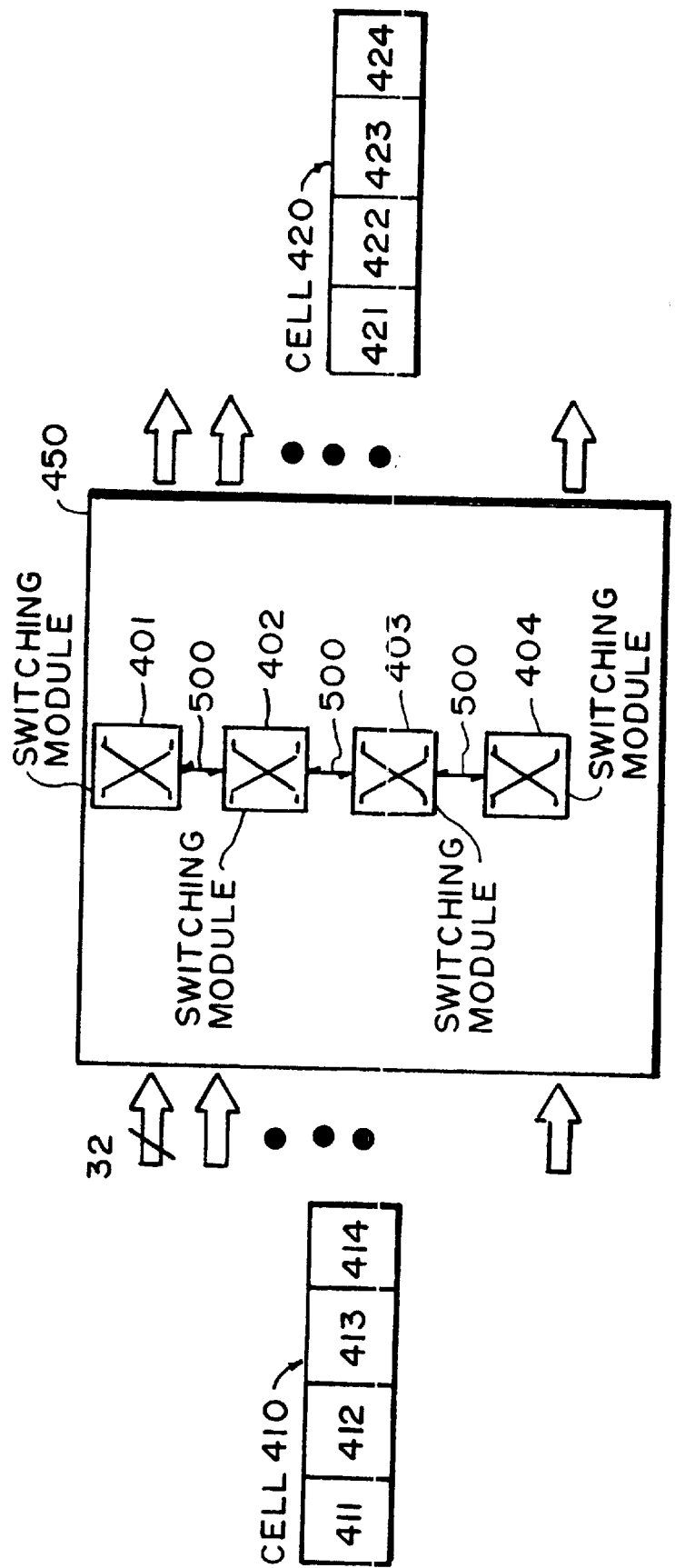
FIG. 5 illustrates the use of multiple switching modules arranged in port speed expansion for carrying out a enhanced switching structure operating at higher speed.

However, there will be requirements of higher speeds in a single stage architecture. The switching module of the present invention permits higher speeds to be attained even with the same technology. This is advantageously permitted by a particular arrangement of identical switching modules 401 which will now be described with more details and which allows a very simple and effective possibility of aggregating multiple different switching modules in a so-called speed expansion mode. FIG. 5 illustrates an arrangement where four different switching modules 401–404 are aggregated in order to constitute a more powerful switching structure 450 operating at a higher speed, In this arrangement of four switching modules 401–404, each cell 410 that is presented to an input port p of aggregate switching structure 450 is logically divided, or sliced into four distinctive parts 411, 412, 413 and 414. The first part 411 of the cell is presented to the input port p of module 401, while the second part 412 is entered into port p of module 402. Similarly, the third and fourth part 413 and 414 of the cell are respectively presented to the input port p of switching module 403 and 404.

As it will appear below, the internal design of the switching modules 401–404 permits such arrangement to be advantageously made, so that the four distinctive parts of the cell 410 are simultaneously processed. On the other side, the cell will be retrieved and routed toward the appropriate output port of each switching module 401–404. More particularly, the first part 421 of cell 420 will be routed at the appropriate output port q of switching module 401, while the second part 422 of cell 420 will be forwarded to the appropriate ouptut port q of switching module 402. Similarly, the third and fourth parts 423 and 424 of the cell will be respectively presented at the appropriate port q of the switching module 403 and 404.

It obviously appears that the simultaneous processings of the four distinctive parts of cell 410 results in a descrease by four of the size of the cell that is actually processed by each individual switching module. Therefore, the four switching modules are fully combined so as to multiply by four the effective speed of the switching structure. This arrangement entails a substantial advantage since it becomes possible, for a given technology, to virtually increase the speed of the switching process. As it will be explained hereinafter with more detail, the substantial increase in the speed is made possible by simply aggregating multiple switching modules of FIGS. 2 and 3. As the cell cycle will be reduced by a factor of four for any switching modules 401–404, it appears that the sole limit for aggregating multiple switching module in order to carry out a more powerful switching structure 450, resides in the need to execute, with the possibilities given by the given technology, the eight elementary clock cycles that are required for both the input and output processes described above. In the present invention, the enhanced switching structure 450 is based on four switching module 401–404 and the description will be fully made for this particular arrangement. However, it should be noticed that the skilled man will straightforwardly adapt the description below for any other combination of switching modules.

In the arrangement of the preferred embodiment, it appears that switching module 401 is presented with the first part of cell 410, that is to say part 401 that includes the routing header used for controlling the routing process as was described above. Therefore, switching module 401 will be used as a master module within the aggregate structure 450, that is to say that the control section of module 401 will operate for the whole set of four switching modules 401–404. The three other switching modules 402–404 will operate as slaves for the routing process, so that the four distinctive parts constituting the output cell 420 will simultaneously appear at the same output port(s) q. Since the storage process inside Cell storage 1 of the master switching module 401 operate randomly, depending upon the storage location that are available at a given instant, it is quite necessary to make sure that the same storage process be performed inside the slave switching modules 402–404 in order to ensure the integrity of the cell that is routed through the four switching module. In the invention, this is advantageously ensured by use of a specific speed expansion control bus 500 that is under control of master switching module 401.

In the preferred embodiment of the invention, Speed Expansion bus 500 is a 32 bit bus which is made of four distinctive parts. Speed Expansion bus 500 includes a first set of eight leads 510-0 to 510-7 that are respectively connected to the input of receivers 44-0 to 44-7, and to the output of drivers 40-0 to 40-7 described above with respect to FIG. 2. Additionally, Speed Expansion bus 500 comprises a second set of eight leads 509-0 to 509-7 that are respectively connected to the output lead of the eights drivers 41-0 to 41-7, also respectively connected to the input lead of the eight receivers 45-0 to 45-7 described above. Further, Speed expansion bus 500 comprises a third set of eight leads that are connected to bus 520 (that is to say to the input lead of the eight receivers 46 and to the output of drivers 42), and a fourth set of eight leads that are connected to bus 521 (i.e. to the input lead of the eight receivers 47 and to the output of the eight drivers 43.

Therefore, it appears that Speed Expansion bus 500 realizes the full connection between the four switching module forming the switching structure. The Speed Expansion mode then operates as follows:

In the master module 401, the different OCD drivers 40, 41, 42 and 43 are enabled. Thus, they provide the routing data that will be conveyed through bus 500 to the other slave switching modules 402–404. Also, Multiplexor 112 (resp. Multiplexor 113) is controlled (by internal processor not shown) so that the contents of register 110 (resp. register 111) is transmitted to pipeline register 114 (resp. pipeline register 115). Multiplexor 26 (resp. multiplexor 27) is configured so that the contents of register 34 (resp. 35) is transmitted to NRA registers 28 (resp. NRA registers 29) since, in this case, no pipeline register is being used.

In the slave switching modules 402–404, the different OCD drivers 40, 41, 42 and 43 are disabled, Multiplexor 112 (resp. Multiplexor 113) is controlled so as to connect the output of Boundary latch 180 (resp. Boundary latch 181) to the pipeline register 114 (resp. pipeline register 115) via the EVEN bus (resp. the ODD bus). On the other side, Multiplexor 26 (resp. Multiplexor 27) is configured so as to connect the output of Boundary latch 80 (resp. Boundary latch 81) to the set of NRA registers 28 (resp. NRA registers 29). Therefore, at each cell cycle the ASA registers 20 and 21, ARA registers 32 and 33 of every switching module 401–404 will contain the same data, thus ensuring the same routing process in the four component of the aggregate switching structure. This achieves a strictly identical routing process being performed inside the four distinctive switching modules and permits that the four distinctive parts of the cell 410 will simultaneously appear at the same appropriate outport ports of the modules 401–404. The full synchronism is particularly achieved by the use of boundary and shadow latches 110, 111, 80 and 81.

It therefore appears that the switching module of the present invention can be easily aggregated with other module in order to achieve a powerful switching structure operating at high speeds.

Although the above description was based on the use of four individual switching modules 401–404, it should be noticed that other arrangements can be achieved. Indeed, the possibility of aggregating similar modules is obviously not limited to four. When using two modules operating in speed expansion mode, the switch speed can be increased by a factor of two.

Figure 6:
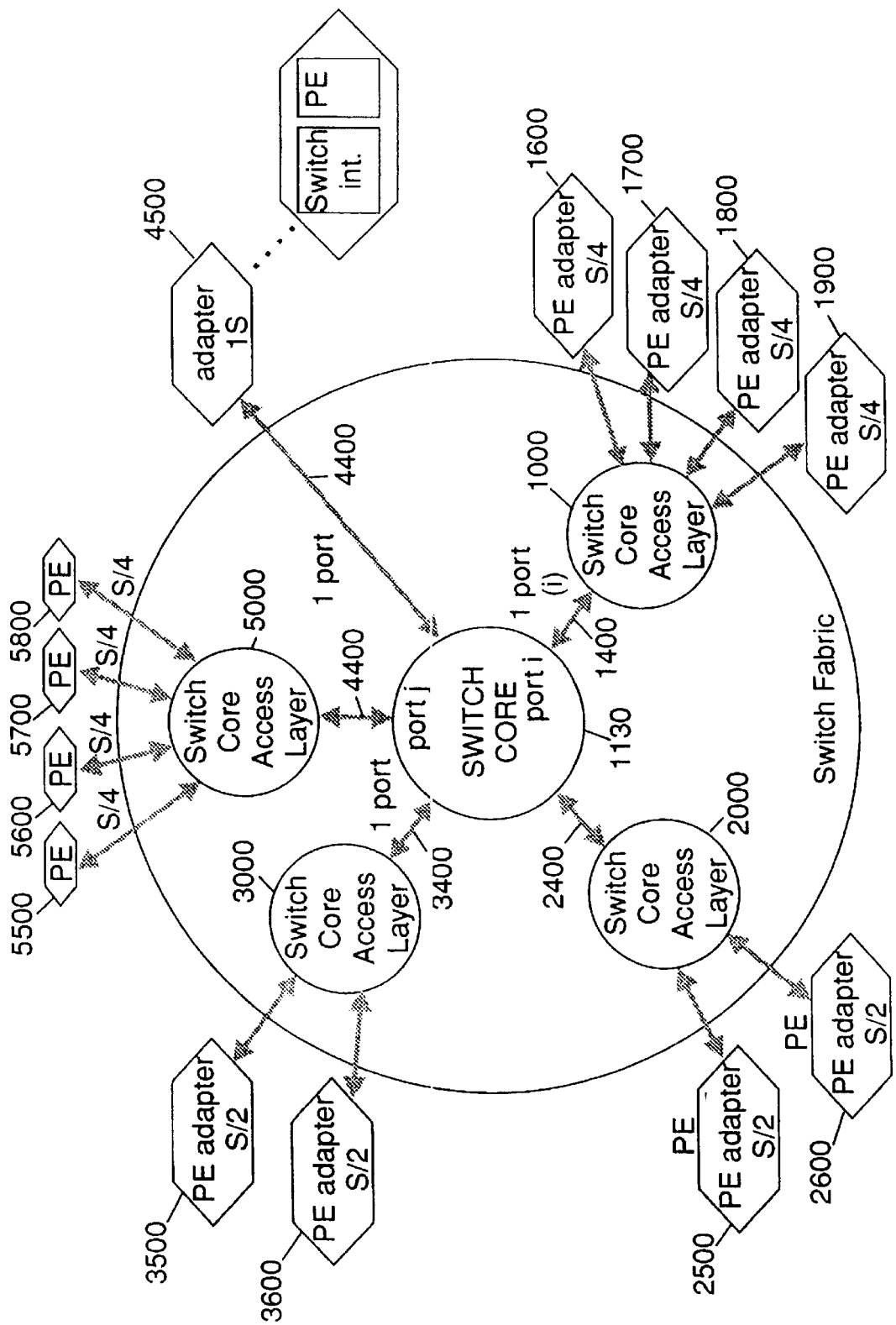
FIG. 6 illustrates a general switch fabric including a switch core based on the switching structure of FIG. 5 associated with Switch Core Access Layers Elements.

The performance of the switching structure—either based on two, four or more switching modules 401—is still enhanced in the present invention by means of a use of specific circuits which are designed to satisfy the numerous requirements that are existing in the market. Indeed, the invention takes advantage of a set of adapters that provides, in addition to the cell slicing that is required for dividing the cell into four parts (in the preferred embodiment of the invention), the different interfaces that are needed by the wide variety of customers. Thus, the invention achieves a highly flexible switching system that can meet most switching requirements, FIG. 6 shows an example of an switching architecture—based on high speed switching structure 450—that achieves a wide variety of lines attachments. Switch core may be located into one building and provides to a set of N different input and output telecommunication ports (sixteen ports in the embodiment of the invention). One port providing a 1.6 Gigabit/s telecommunication link may be used for providing a high speed communication link (represented in reference to arrow 4400) with an adapter 4500, Switch core 1130 has a 1.6 Gigabit/s port i that provides a telecommunication link 1400 to a Switch Core Access Layer (SCAL) element 1000. SCAL element 1000 provides attachement to four so called Protocol Engines adapters 1600, 1700, 1800 and 1900 that each provide a s/4 communication link. A third port of switch core 1130 is dedicated to a link 2400 to another SCAL element 2000, which provides with the attachment to two s/2 Protocol Engines adapters. A similar attachment may be provided by means of a an additional SCAL element 3000 attached to two PE adapters 3500 and 3600 sharing the 1.6 Gigabit/s communication link 3400 provided by switch core 1130. At last, in the example illustrated in the figure, a SCAL element 5000 allows attachment to four s/4 Protocol Engines 5500–5800 which gets an access to the 1.6 Gigabit/s dataflow of port j of switch fabric 450 via link 4400. In the preferred embodiment of the invention, SCAL elements 1000–2000 and 3000 take the form of electronic packages to which are attached the different Protocol Engines which takes the form of electronic cards.

As it will be shown hereinafter with more detail, the invention provides two distinctive embodiments of the general architecture, an example of which being illustrated in FIG. 6. Indeed, depending on the requirements of the customer, the switch fabric may take two distinctive forms: a first so-called compact switch fabric architecture and a second so-called, distributed switch fabric architecture.

The first embodiment of the invention referred to as the compact switch fabric architecture is used when a high flexibility and powerful switch is need in a close, compact area. In this case, the switch core 1130 and the different SCAL elements 1000, 2000f, 3000 and 5000 are located in the same restricted physical area by means of direct 1.6 Gigabit/s communication link, based on the use of coaxial cables.

However, in the most general cases, the lines attachements are located in different physical areas of an industrial set of buildings. In this case, the invention permits the SCAL elements to be located far enough from the switch core 1130—up to 100 meters—by means of 1.6 Gigabit/s communication links 1400, 2400i, 3400 which are each based on a set of optical fibers communication links, at least four 500 Mbits/s optical links for the data. This results in simple connections being performed for the attachments of the different elements forming the switching architecture, so called "switch fabric".

Figure 7:
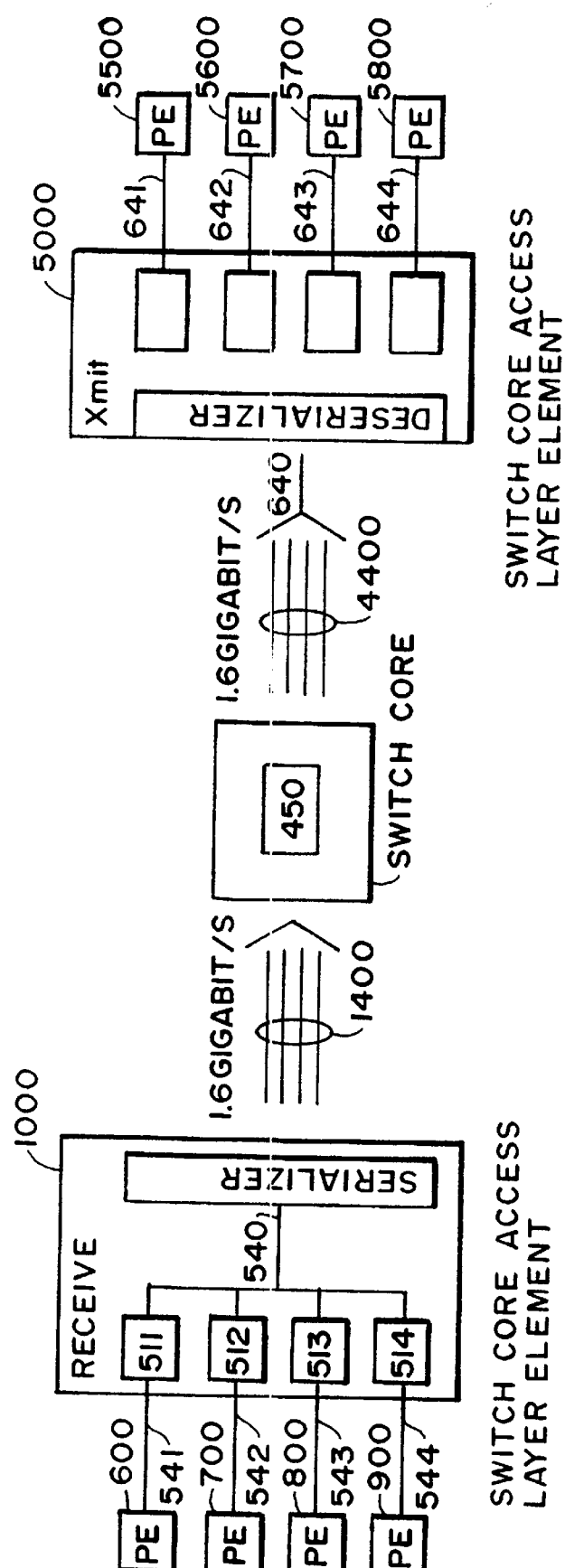
FIG. 7 illustrates the logical flow of the distributed switch core fabric embodiment.

The structure of the receive and transmit part of each SCAL element 1000–5000 is illustrated with respect to FIG. 7 showing the logical dataflow between receive part of SCAL element 1000 (communicating through port i of switch core 1130) and the transmit part of the SCAL element 5000 that is attached to port j of switch core 1130. This figure particularly illustrates the above mentioned distributed embodiment of the switch fabric where each Switch Core Access Layer layer element 1000–5000 is located from the switch core 1130 from a distance being at least up to 100 meters. The receive and transmit part of one SCAL element will now be particularly described and it will be assumed that this SCAL element provide with the attachment to four Protocol Engines. However, it should be noticed that the SCAL structure of the invention is not limited to this particular arrangement of four Protocol Engines. Protocol Engines 1600–1900 may provide attachment to two OC3/STM1 links each according to CCITT Recommendations for instance, or still to eight DS3 communication links. In the present invention, each Protocol Engine being connected to a SCAL element is associated with one so-called PINT element. With respect to the receive part of the SCAL element 1000, PE 1600 (resp. PE 1700i, PE 1800,r PE 1900) is associated with a PINT element 511 (resp. 512, 513, 514) via bus 541 (resp. 542, 543 and 544). While with respect to the transmit side of SCAL element 5000 (attached on port j), PE 5500 (resp. 5600, 5700, 5800) receives data cells from a PINT 611 (resp. 612, 613, 614) via bus 641 (resp. 642, 643f 644). Should the number of Protocol Engines attached to a SCAL element (for instance SCAL 2000) be limited to two, then the latter will only include a set of two PINT circuits.

Additionally, the SCAL elements are fitted with a serializer/deserializer circuits allowing the conversion of the data flow so as to reduce the number of coax cables (in the compact switch core) or optical fibers (in the distributed switch core).

FIG. 7 illustrates the logical flow of data between two determined ports; for instance, port i on the receive side and port j on the transmit side. Therefore, each element appearing at the left of the switching structure 450 should bear an indicia i indicating that its correspondence to the port number i. Similarly, every element appearing on the right side of block 450 should bear an indicia j for expressing the destination output port j.

However, for clarity's sake, the indicia will be suppressed in FIG. 6 for simplifying the description below. The use of the indicia will however be introduced in the FIG. 9 when considering the multicast description of the enhanced switching system.

It should be noticed that the general term of "Protocol Engine" designates the line adaptation layer of the different lines that exists on the market. Basically, this term stands for hardware and software functional components that are well known to the skilled man and that provides the line interface adaptation to the different lines used by the customers. Such lines may include lines carrying ATM protocols, T3. DS3, AT1, E1, and interfaces such as FCS, ESCON etc . . . Such a system can be for instance the "Trunk Port Adapter" that is marketed by IBM for the NWays 2220 model 500.

A particular improved ATM protocol Engine will be described in detail in reference with FIGS. 14 to 17. However, whatever the particular type of line being interfaced, it should be kept in mind that the Protocol Engine is used for interfacing the line used by the customers and for providing SCAL element 1000 with cells that are intented for the swich core 450, the cells comprising a routing header and a payload. The routing header of the cells is used in accordance with the above described routing mechanism.

Figure 8:
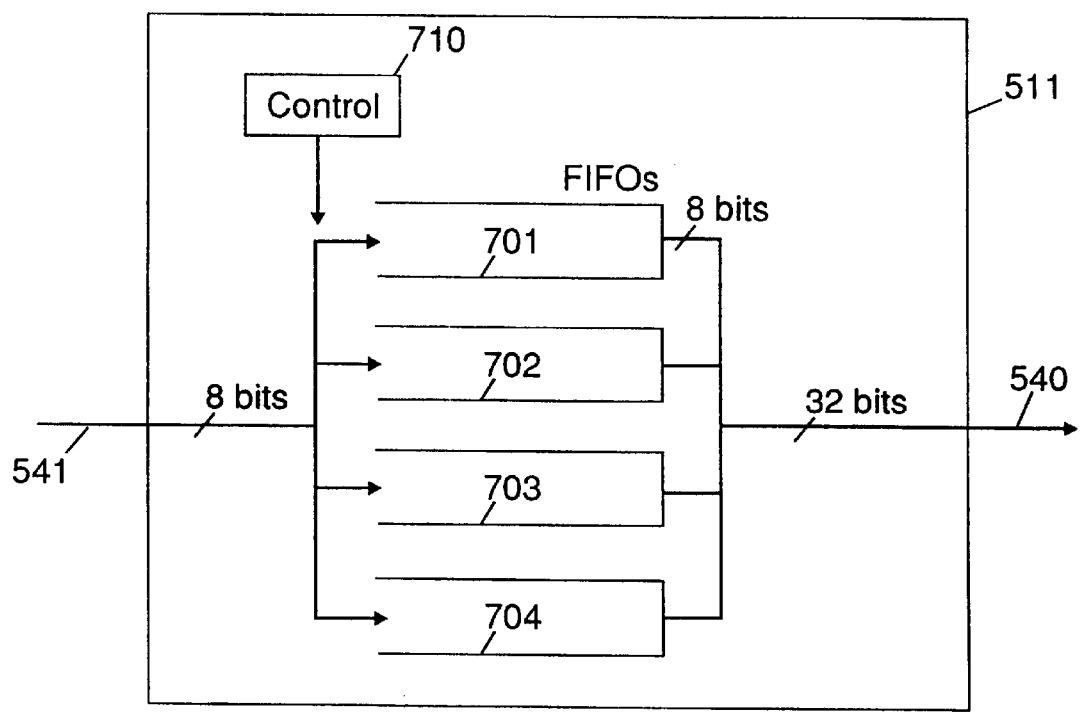
FIG. 8 shows the PINT receive part 511 of SCAL of the present invention.

FIG. 8 shows the structure of any one of the receive part of PINT circuit 511–514 of the Switch Core Access layer element 1000. The data flow coming on B-bit input bus 541 is distributed through four FIFO storages 701–704 so that the first byte is entered into FIFO 701, the second one into FIFO 702, the third one into FIFO 703, the fourth one into FIFO 704, the fifth one into FIFO 701 again etc . . . Therefore, the 8-bit data flow is transformed into a four-bytes output bus 540 that is needed by the four switching modules of structure 450. In the so-called compact switch fabric embodiment, each byte is transmitted by means of the serializer/deserializer and a common coax cable while in the distributed switch core each byte uses the path formed by the serializer/deserializer and a longer optical fiber. Therefore, bus 540 provides with four flows of bytes that are directed to the four sets of receivers of each individual switching modules.

For both the compact and distributed embodiments of the switch fabric, it should be noticed that the first byte of bus 540 (the 8 MSB) is intented to be transmitted to the 8-bits input bus of receiver 10 at the appropriate input port of the first module 401. Similarly, the second byte of bus 540 (bits number 9 to 15) is transmitted to the input of receiver 10 at the appropriate input port of the second switch module 402, etc . . . Should the cell being received at the input port 541 of element 511 in N cycles, the same cell is approximately presented at the input of the four switching modules 401–404 in N/4 cycles. In the preferred embodiment of the invention, the cell which arrives at input bus 541 has 58 bytes. This set of 58 bytes is completed by two additional bytes that are incorporated at appropriate locations within the cell in order to form a 60-bytes cell which, when distributed through the four FIFOS, provides a succession of 15 sets of 4-bytes words that can be processed by the switching modules 401–404. The two extra bytes which are added to the 58 original bytes are used in conjunction with the above described "bit-map mode" or "two-byte header multicast mode". To achieve this, and assuming that the switching module that operates as a master is module 401, a control circuit 710 provides the incorporation of the two bit-map bytes at the first and second location within FIFO 701 (that is to say at the first and fifth position of the cell being received on bus 541). Therefore, switching module 401 receives the two bit-map bytes forming the routing header at the first locations of the data flow coming at its input port. It should be noticed that the speed on the two busses 541 and 540 are largely independent since the former may be lower than the latter. Assuming that the switch operates at a speed of 20 nanoseconds (corresponding to an aggregate data flow of 1.6 gigabits/s), the higher speed that is permitted on bus 541 appears to be 60/58×20 nanoseconds. In addition to the PINT circuits, the SCAL element 1000 further includes control logic that provides control of the four "Enable-Output" input leads (not shown) of PINT circuits 511–514 so that aggregate switching structure 450 can successively process the cell received by circuit 511 (requiring fifteen cycles in the preferred embodiment), then the cell received by element 512, then that received by element 513 and so on. In this way, each PINT circuit 511–514 gets an access of the fourth of the bandwitdh of the bus 540.

Figure 9:
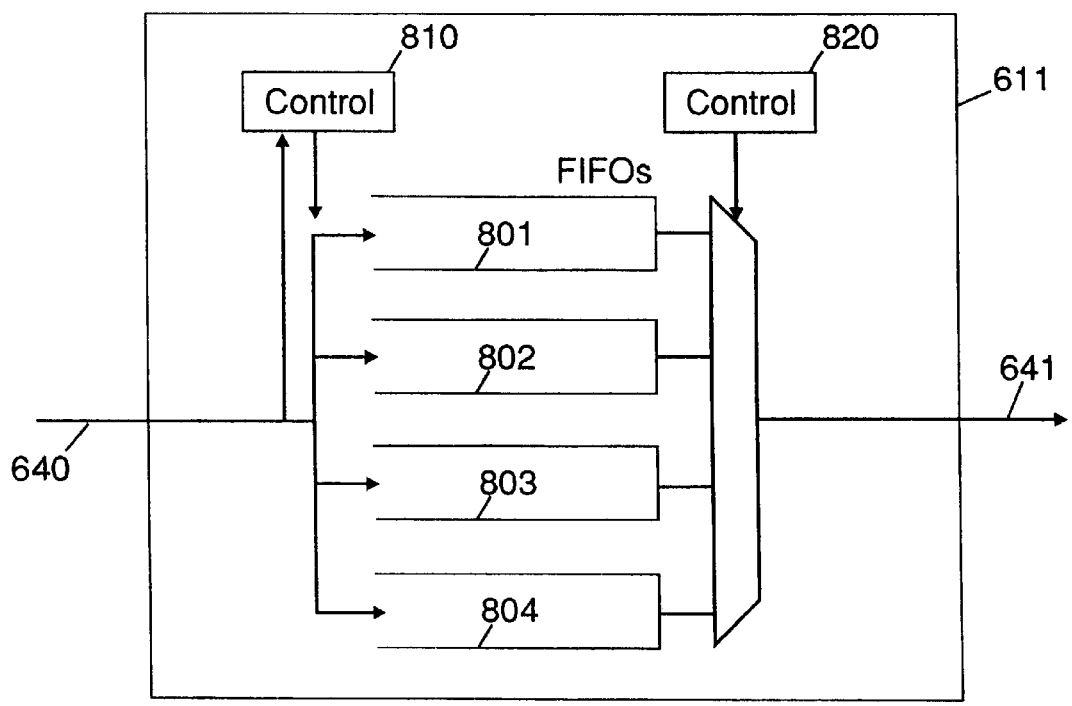
FIG. 9 shows the PINT transmit part 611 of the SCAL of the present invention.

FIG. 9 illustrates the structure of the four transmit parts of PINT circuits 611–614. Each PINT element 611–614 receives the totality of the 32-bit bus 640. The latter receives the four parallel flows of serialized bytes that are received from the four coax cables separating the switch core from the SCAL (in the compact embodiment) or from the four optical links (in the distributed switch fabric where the different SCALs are located at different physical areas with respect to the switch core 1130). Each PINT element 611 is fitted with a set of four FIFOs 801–804 that presents a storage capacity that is far higher than that of the FIFO used for the received part. In the preferred embodiment of the invention, the ratio between the FIFO storages 801–804 and the FIFO storage 701–704 is fixed to at least 250 in order to ensure high buffering when many cells are to be destinated to a same output port.

Considering for instance transmit block 611, a control module 810 receives the data coming from bus 640 and extracts the "bit map" two bytes from the cell being received. From the value that is currently carried by these two bytes, control module 810 determines whether the cell has to be loaded into a set of four FIFO registers 801–804, or discarded. In the first case, Control Module 810 generates a load control signal which allows each of the four bytes carried by the 32-bit bus 640 to be loaded into its corresponding FIFO register 801–804. For instance, the first byte appearing on bits 0–7 of bus 640 will be loaded into FIFO 801, while the second byte (bit 8–15) will be transferred into FIFO 802 and so on. In the second case, if the cell appears to be discarded by the considered transmit block, then Control module 810 does not generate the load control signal, thus preventing the loading of the cell into the FIFO registers.

Any one of the four elements 611 to 614 receives the same cells which appear on the common bus 640. However, since the two-byte "bit-map" header is used by each of the elements 611 to 614 in order to control or not the loading of the considered cell into the internal FIFO queues, it appears that this header also realizes a multicast operation that still permits the duplication of the cell coming on bus 640 to multiple output directions. In the preferred embodiment of the invention, the first bit of the header is used by Control Module 810 in order to determine whether the cell has to be duplicated to the output bus 641, while the second bit of the two-bytes header is used by Control Module of element 612, and so on.

In each block 611–614, the four FIFOs are accessed by a Control Module 820 which is used for regenerating the sequence of the different bytes forming the cell on a 8-bit bus 641. Additionally, control Module 820 provides the removal of the "bit map" two-bytes header so that the cell becomes identical to the one that was received by the receive part of the SCAL circuit 1000. In the preferred embodiment of the invention, this is simply achieved since the "bit-map" header always occupies a fixed position within the 60 bytes forming the cell. The Protocol Engines 5500–5800 are then provided with the appropriate train of cells generated by the blocks 611–614.

It should be noticed that the invention provides two independent embodiments that both provide with wide flexibility because of the efficient cooperation between the powerful switching structure 450 and the different SCAL elements being attached to every ports. In one embodiment, it was shown that the SCAL elements are all located close to the switch core 1130, thus providing a compact switching architecture. In the second embodiment, where numerous line adapters attachments are required in a wide industrial area, the invention uses the serializer/deserializer in association with optical fibers so as to achieve links that can attain at least 100 meters long.

Figure 10:
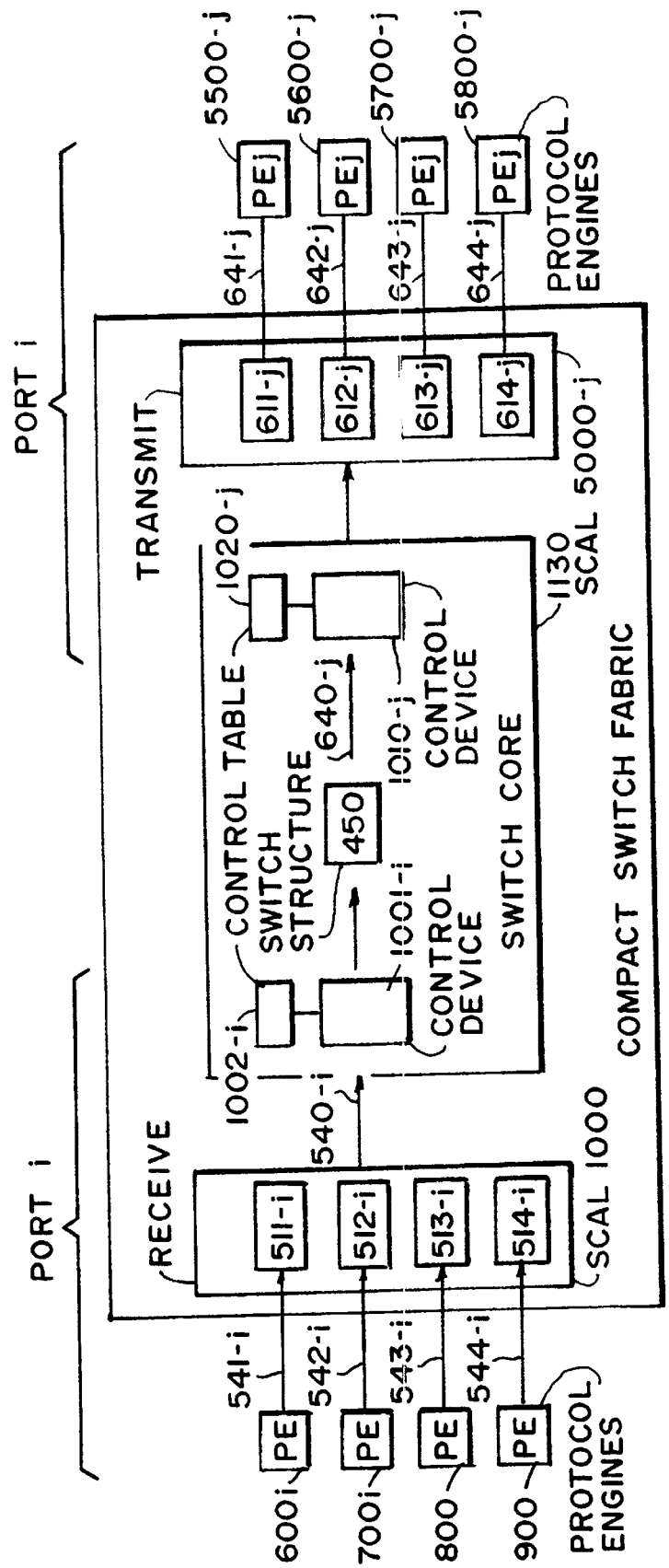
FIG. 10 illustrates a compact switch fabric embodiment enhanced in order to provide wide multicast capability.

FIG. 10 illustrates a substantial optional enhancement that can be brought to the switching fabric of FIG. 7 that provides wide multicast capabilites for both the compact and distributed switch fabric embodiments. For clarity's sake, the explanation will be made for the compact switch fabric embodiment, where the SCAL elements can directly communicate with the switching structure 450 by means of bus 540 without the use of the additional path formed of the serializer, the optical channels and the deserializer (required for forming again the 32 wide bus at each input port of the switch core 1130).

In this figure, indicia i and j are introduced in order to clearly illustrates the logical path of a cell arriving at one input port i, and which is routed to output port j. Additionally, it is assumed that the sixteen SCAL that are attached to the switching structure are based on a similar structure, that is to say includes four identical PINT elements (associated to four corresponding Protocol Engines).

In the figure, there is shown that bus 540-i connecting the switch structure 450 to the PINT receive circuit 511-i, 512-il 513-i and 514-i of SCAL element 1000, is separated in two parts by means of the insertion of a routing control device 1001-i. Similarly, bus 640-j that connects the output of aggregate switching structure 450 to the PINT transmit circuits 611-j, 612-j, 613-j and 614-j of SCAL 5000-j, is separated by means of the insertion of another Control Routing Device 1010-j. Each control device among the set of 32 control devices being inserted in the 32 input and output busses of switching structure 450 is associated to a corresponding Routing Control Table 1002-i and 1020-j which is used for performing the routing process of the cell. For instance, Control Device 1001-i is associated with its corresponding Routing Control Table 1002-i, while Control Device 1010-j is associated with its corresponding Routing Control Table 1020-j.

This enhanced compact switch fabric operates as follows:

Assuming for instance that Protocol Engine 1600-i at port i generates a cell comprising a Switch Routing Header (SRH) followed by a payload, this SRH is characteristics of the destination Protocol Engine which will receive this cell. Should the cell be transported to one unique destination PE, then the switching will have to be unicast. In the reverse case, there will be multiple destination Protocol Engines and the switching will be multicast. In accordance with the above description, the cell is entered into the PINT receive circuit 511-i which introduces within the cell a set of two bytes that will be affected to the location of the bit map that will be determined later on by the Routing Control Device 1001-i. The cell is then propagated on the bus 540-i as described above, and is presented after communication on optical lines to the Routing Control Device 1001-i. This element executes on the fly the following operations. Firstly, the latter accesses the associated Routing Control Table 1002-i using the SRH as an address. The value that is extracted from this table is then inserted, on the fly, within the cell at the two additional locations that were inserted before by the PINT receive circuit 511-i. Therefore, the master switching module 401 receives these two bytes at its first locations within the cell coming at its input port and can use them in accordance with the two-bytes header multicast mode (bit map mode).

After the cell is processed by the Routing Control Device 1001-i, the latter is presented at the input bus of aggregate switching module 450, so that the master module 401 can use the bit map appearing at its first two bytes in order to control the overall routing mechanism for the four elements. However, it should be noticed that the same mechanism could be used with one single switching module.

Then the switching structure 450 duplicates the cell being received at the appropriate output ports. Assuming that the cell being considered is duplicated at the ports j, k and 1, it will appear on busses 640-j, 640-k and 640-1.

The cell being presented on bus 640-j is entered into the Routing Control Device 1010-j which, as above, accesses the associated Routing Control Table 1020-j in order to extract data that includes a two-bytes bit map that will be used by the transmit part of PINT element 100-j of the SCAL circuit 1000. This extraction uses the SRH data that is incorporated in the cell being received. It should be noticed that, as above, the access of Routing Control Table 1020-j can also be used for providing additional bits that can be advantageously used for control purposes.

The newly extracted bit-map header is then used by SCAL circuit 5000-j for determining which one(s) of the PINT transmit circuits 611-j; 612-j, 613-j and 614-j will have to propagate the cell. For instance, should the bit map only contains a single 111", then the cell will be propagated to one single element (for instance block 611-j), while if the bit map contains two 11111 the cell will be propagated by two different elements. It therefore appears that a second duplication step is introduced, the former one occuring within the switching structure 450. Each Protocol Engine 5500-jf 5600-jf 5700-j and 5800-j can then be accessed by the cell in accordance with the bit-map that was determined by Routing Control Device 1010-j. which bit-map was uniquely determined in accordance with the SRH that was transported by the cell. It appears that the SRH that is determined by each Protocol Engine is considered by the switching structure 450 and the PINT circuits of SCAL 1000-j as a part of their payload, while the routing header used for controlling the switching mechanism is locally generated from this SRH.

The same mechanism applies for the ports k and 1, thus resulting in the cell being duplicated by one or more elements 611-k, 612-kf 613-k or 614-k, 611-1, 612-11 613-1 or 614-1 of the PINT elements 100-k and 100-1. A wide possibililty of multiplexing through the two distinctive multiplexing stages is thus permitted within the switching system.

In the preferred embodiment of the invention, the Routing Control Devices are located within the switch core 450. This substantially enhances the possibilities of the switch since there becomes very simple to update the different contents of the multiple Control Routing Tables. Additionally, this presents the advantage of the possibility of using slower, cheaper and larger memory than that used for embodying Multicast table 6 which must be very rapid since it might occur that the latter is continuously in operation during one cell cycle). Further, the possibility of providing larger storage (also resulting from the fact that this storage may be located outside the chip of the switching module) for embodying Control Routing Tables permits to increase the number of routing SRH labels.

At last this feature appears to be very simple to embody the second so-called distributed switch fabric embodiment where the SCAL elements 1000–5000 are to be located at different physical locations of an industrial area.

Figure 11:
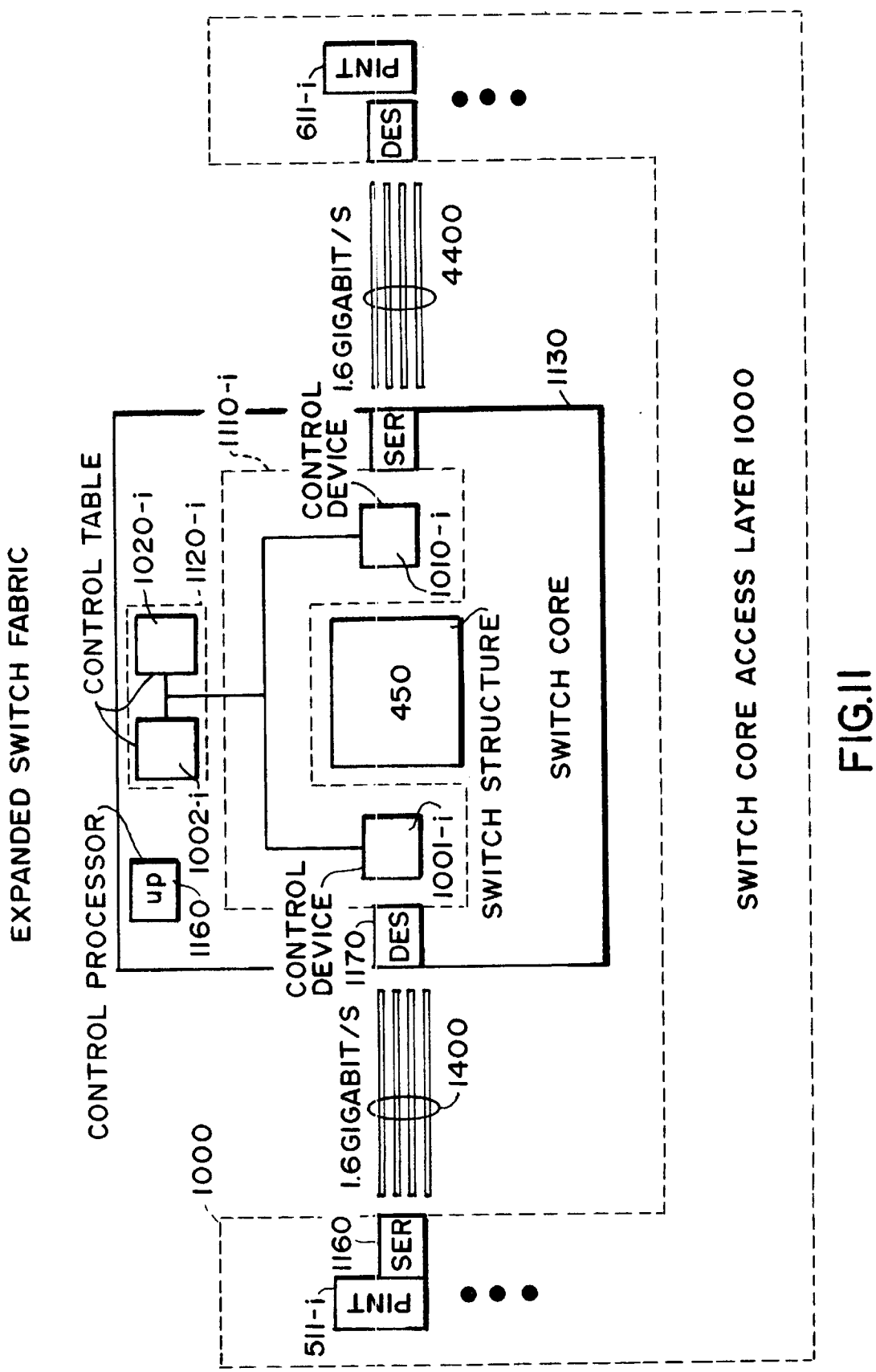
FIG. 11 illustrates the distributed switch fabric enhanced in order to provide wide multicast capability.

FIG. 11 shows the arrangement of the distributed switch fabric that providing great flexibility and high speed and which further permits, by using the Control Routing mechanism described above, a wide multicasting capability. Dotted lines represent the physical boundaries of the modules or packages.

There is shown the switch core 1130 taking the form of one physical apparatus, which includes the switch structure 450, generally embodied under the form of a card comprising at least the four switching elementary modules, each module being an electronic chip. The two Routing control devices 1001-i and 1010-i that are associated to a same port i are embodied into a same physical chip 1110-i that is associated to a corresponding storage 1120-i that contains the two Routing Control Tables 1002-i and 1020-i described above in reference with FIG. 9. It therefore appears that switch structure 450 and the sixteen associated modules 1110 and 1120 are advantageously located in the same physical package, while the different SCAL elements are distributed in the different physical area of the industrial premisses where line attachment needs appear to be.

As mentioned above, the distributed switch fabric comprises a set of N physically distributed SCAL packages (N being equal to 16 in the preferred embodiment of the invention), only SCAL package 1000 being represented in the figure. Every SCAL package contains the PINT receive and transmit circuits that are each associated to one attached Protocol Engine. The latter are embodied under the form of additional cards that are plugged into the SCAL electronic circuitry board. Since the 1.6 Gigabit/s communication link between each SCAL and the switch core 1130 is achieved by means of a set of optical fibers (at least four for the data path), the two elements can separated by a large distance with an optical fiber. This is very advantageous since it becomes possible to realize a powerful switching connection whatever the position of the different telecommunication links in the industrial premisses. Should for instance an ATM link be located in a first building and an OC3 in a second one, the invention achieves the switching connection by simply using a first SCAL package receiving an ATM PE in the first building, a second SCAL element in a second building... This example shows the great flexibility of the solution of the present invention that particulary avoid the drawbacks of solutions of the prior art, based on costly telecommunication cables or on a multiples switches that are arranged in networks—each switch being located into one premisse—thus using their ports for the network connection. Since the ports that are used for achieving the network connections of the different switches, it obviously results that these network connection ports are lost from the customer standpoint because they can not be affected to a communication link. The architecture of the present invention eliminates all these drawbacks.

Further, it could be possible to use the teaching of document "Single-chip 4×500 Mbaud CMOS Transceiver" from A, Wilmer et al, in IEEE ISSCC96, Session 7, ATM/SOMET/PAPER FA 7.7. Published on Feb. 9th, 1996 for providing the possibilty of embodying the 1.6 Gigabit/s communication links 1400, 2400, 3400 and 4400 which is incorporated by simple reference. This document shows the possibility of using the so called 8B/10B. During idle periods that are marked by a flag, fill packets of data are transmitted, which start with a non-data Comma character. The Comma marks both byte and cell boundaries on the serial link. Therefore, synchronization at the byte and packet level can be provided and the 1, 6 Gigabit/s communication link may be embodied by means of an unique set of four optical cables, either coax or opticals. The reduction of the number of cables is substantial since, without this feature, at least five or six opticals lines would be necessary for embodying the 1.6 Gigabit/s communication link.

It should be noticed that the Switch Core package 1130 contains a processor 1160 which can access, for control purposes, any storage and register within the package. In addition, there is incorporated additional circuitry that monitors the presence of the particular bit map header being set to X'00001, which causes the cell to be extracted from the normal data processing using ASA and NSA registers and being directly loaded into one particular fixed location within the storage 1, shown in the figure under the name Control Packet Storage. This achieves a general extraction process allowing the processor to get an access to control cells. Conversely, the process is also provided with an insertion process allowing the possibility to propagate a cell loaded into the last position of the memory towards any one of the output port.

As the particular bit map XIOOOOI is used for control purpose between the control processor (inside the switch core) and other components of the switch fabric, the latter value is no longer available available for discarding the cells. This possibility is reestablished by means of an additional control bit—a so called "valid bit" is advantageously used for discarding the cells. The valid bit is provided from the read operations of tables 1002 and 1020.

Therefore it appears that the general control processor that is located within the switch core package can access and load values within the sixteens Routing Control Tables that are embodied into the sixteen storages modules 1120.

First, the procedure begins with an initialization step 1220 where the control processor 1160 affects a set of SRH routing labels. This is made possible since the processor is aware of its own topology and therefore can assigns some SRH values that can distinguish the different Protocol Engines connected to the different ports.

This is achieved by using the following allocation procedure:

The processor first determines the number of Protocol Engine that are associated to a given output Port, and then assigns a number of SRH values so as to distinguish the PE to each other. For instance, assuming that port number 0 is associated to four different Protocol Engines (connected to SCAL 1000), the processor will reserve four different SRH values to each Protocol Engines and so on. Therefore, according to the topology of the switch architecture, the control processor 1160 assigns the desired number of SRH values that are needed to distinguish the different Protocol Engines.

Then the Routing Table creation can be executed. Firstly, it should be noticed that each Table 1002-i will contain the same data since all the cells that will arrive on bus 540-i (and containing the same SRH routing label) will have to be propagated to the same output port. The SRH is characteristic of the destination, and not the connection. Therefore, the processor builds a table which complies to the following format:

TABLE

| Add ! | data loaded into table 1002-0 | | data'loaded into table 1020-0 (left adjusted). |
|---|---|---|---|
| X' 0000' | X'8000 port 0 of 450 | X'8000' | PE number 0 on PINT of SCAL 1000-0 |
| X' 0001' 0000 0000 | X'8000 port 0 of 450 | X'4000' | representing "0100 000" PE number 1 on the PINT |
| X'0002' | X'8000 port 0 of 450 | X'2000' | PE number 2 on the PINT |
| X"0003 | X'8000 port 0 of 450 | X'1000' | PE number 3 on the PINT |
| X'0004 1000-1 | X'8000 port 0 of 450 | X'8000' | PE number 0 on the PINT |

Figure 12:
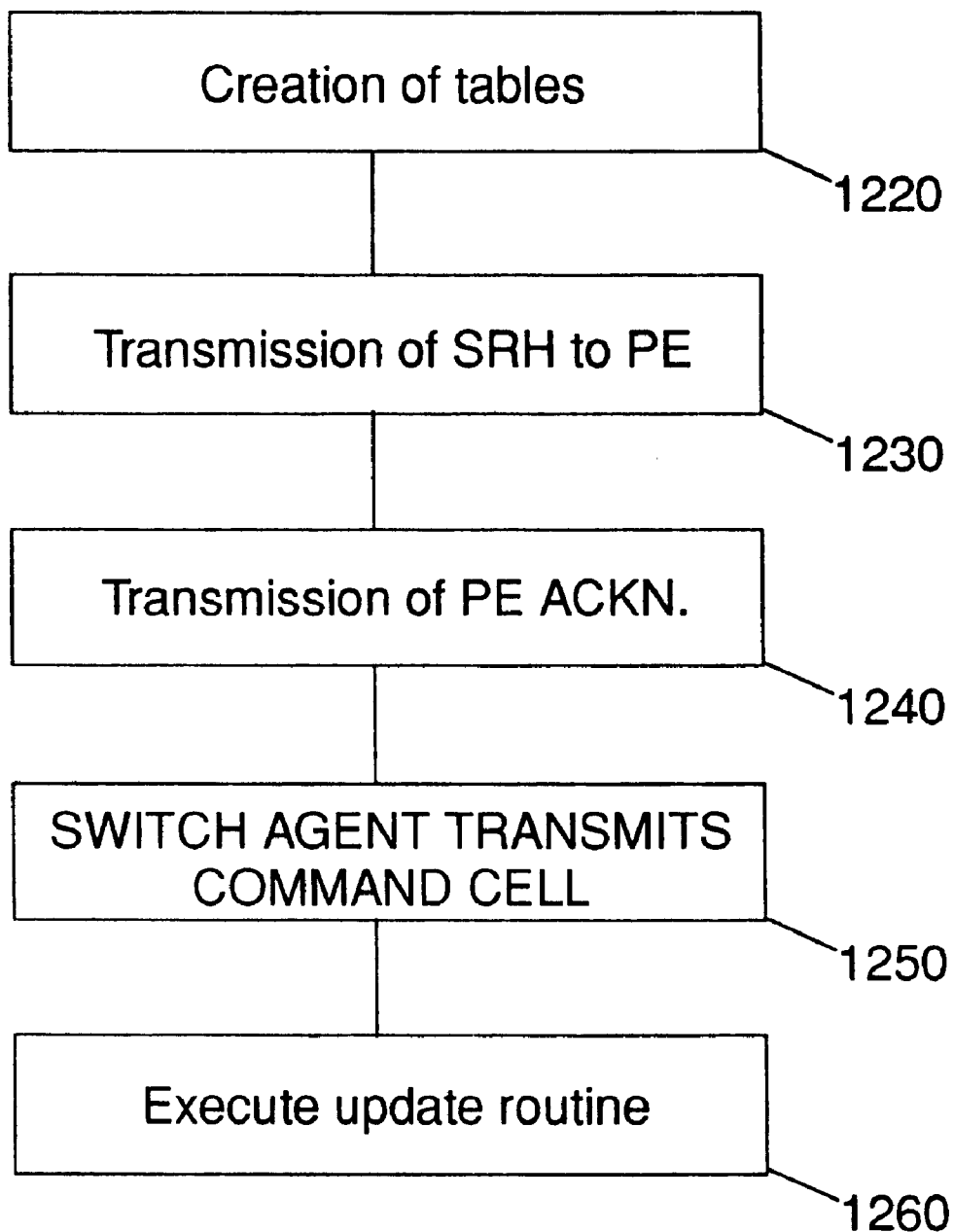
FIGS. 12 and 13 illustrate the update and creation procedure of the Control Routing Tables.

Now it will be described the general procedure that is used for creating and updating the Routing Control tables 1002-i and 1020-i which are located in the same chip. The procedure is illustrated in FIG. 12.

A similar format is used for the tables 1002-1 and 1020-1, then 1002-2 and 1020-2, etc... but the values that are therein loaded are set to zero (at the exception of the valid bit). A more detailed representation of the table, clearly illustrating the use of the valid bit, can be found in Table A as follows:

TABLE A

| tables address SRH | 1002-i | 1020-0 | 1020-1 | 1020-2 | 1020-3 | ... |
|---|---|---|---|---|---|---|
| x'0000' | x'80000' | x'80000' | valid bit off | valid bit off | valid bit off | |
| x'0001' | " | x'4000' | " | " | " | |
| x'0002' | " | x'2000' | " | " | " | |
| x'0003' | " | x'1000' | " | " | " | |
| x'4000' | x'4000' | valid bit off | x'8000' | valid bit off | valid bit off | |
| x'0005' | " | " | x'4000' | " | " | |
| x'0006' | " | " | x'2000' | " | " | |
| x'0007' | " | " | x'1000' | " | " | |
| x'0008' | x'2000' | valid bit off | valid bit off | x'8000' | valid bit off | |
| x'0009' | " | " | " | x'4000' | " | |
| x'000A' | " | " | " | x'2000' | " | |
| x'000B' | " | " | " | x'1000' | " | |
| x'000C' | x'1000' | valid bit off | valid bit off | valid bit off | x'8000' | |
| x'000D' | " | " | " | " | x'4000' | |
| x'000E' | " | " | " | " | x'2000' | |
| '000F'x | " | " | " | " | x'1000' | |

TABLE A-continued

| tables address SRH | 1002-i | 1020-0 | 1020-1 | 1020-2 | 1020-3 | ... |
|---|---|---|---|---|---|---|
| . | . | . | . | . | . | . |
| . | . | . | . | . | . | |
| . | . | . | . | . | . | |
| x'0100' | x'0000' | valid bit off | valid bit off | valid bit off | valid bit off | |
| . | . | . | . | . | . | |
| . | . | . | . | . | . | |
| . | . | . | . | . | . | |

Additionally, a particular SRH value is reserved for the communication between the processor 1160 and any PE.

The initialization procedure completes when the different Control routing tables are loaded. Then, step 1230, processor 1160 uses the general insert capability for transmitting to every Protocol Engine a cell, characterized by a specific format, in order to inform it of the particular SRH value that was assigned to it. Therefore, each PE is made aware of a particular SRH value distinguishing it from the other ones. Then, step 1240, each adapter acknowledges this assignment by means of the specific SRH value that is dedicated for the communication between processor 1160 and the PE.

Then, a switch agent that operates within one particular protocol engine is used for managing the different connections. Such a function is well known to the skilled man and involves, in the particular ATM case, the management of the allocation of the VP/VC parameters. This switch agent is used for handling the correspondence between the different connections and the SRH routing values that were affected to each Protocol Engines. It should be noticed that numerous connections can be associated to one single PE. Generally speaking the switch agent is aware of the precise topology of the network that may includes a wide number of different switches as the one illustrated in FIG. 11. In particular, the switch agent can determine, should a switch X located into one country, wishes to communicate with a switch Y located into another area, which output ports are involved in this communication. Therefore, since it knows the output port that has to be used, it can determine the unicast SRH (that is the SRH provided during the initialization period 1220) that is needed. Therefore, step 1250, the switch agent initiates the building of a COMMAND cell which will be designated to the processor 1160 within the switch.

This cell will have a payload that is arranged as follows:

!Command! SRH_connection label label 2 label 3 . . . !

with a first field (Command) defining a particular command which is requested by the switch agent. The second field; namely, the SRH connection field is used for defining the SRH that is affected to the connection and then follows one or more unicast routing labels that define the destination Protocol Engines for the cells which will includes the SRH defined in the second field. Basically, the third field comprises the distribution list of the unicast routing labels (which were already affected during initialization period 1220) of the destination PE . . . )

Then, step 1260, processor 1160 uses this information being received in order to store into memory 1002-i, at the address defined by the second field (SRH_connection), the data that will be used for controlling the different Control Routing Devices. This is advantageously achieved by the update routing algorithm that follows and which uses the unicast SRH allocation that were made during the initialization procedure.

Figure 13:
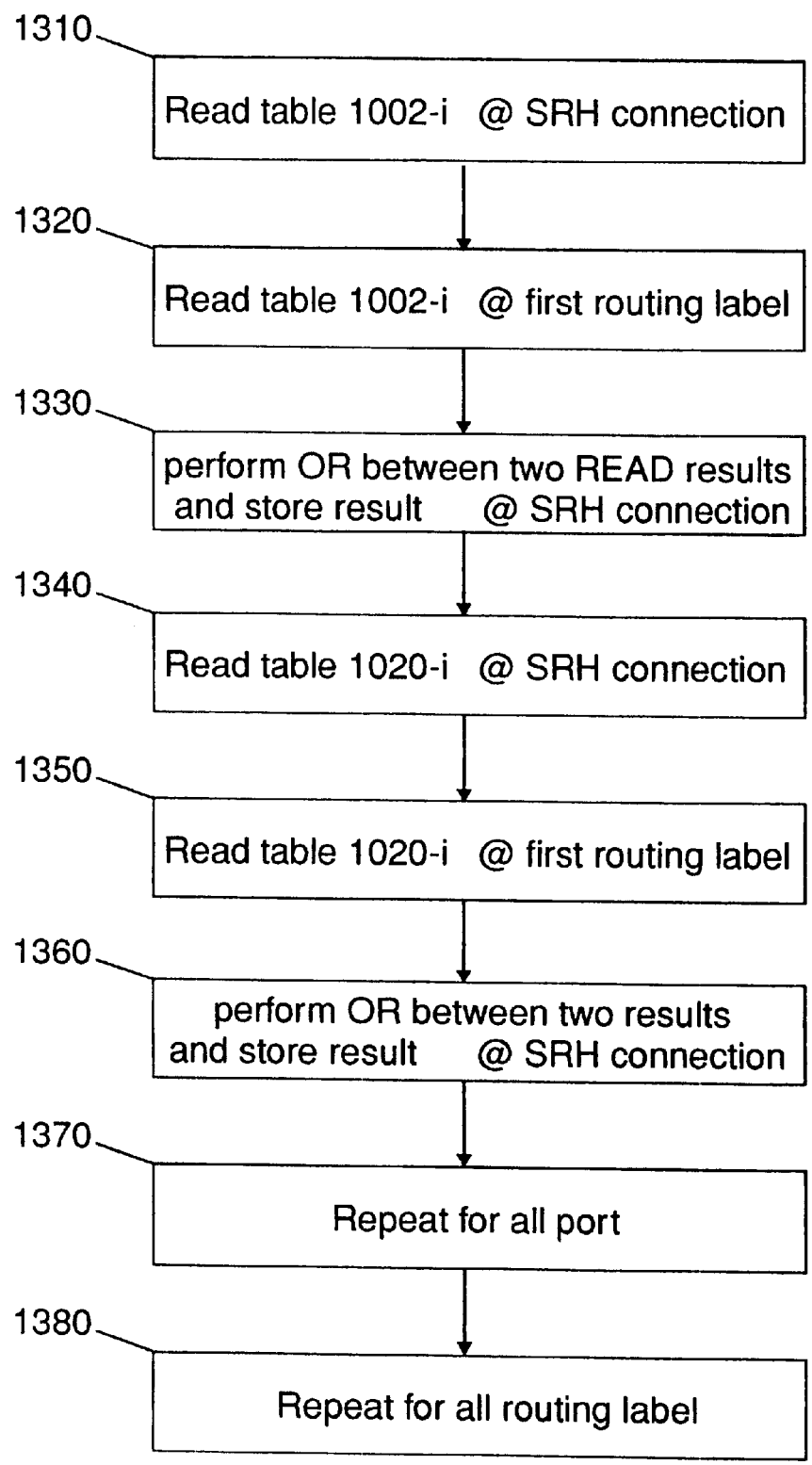

The Update Algorithm is Shown in FIG. 13 and Operates as Follows:

Step 1310 processor 1160 performs a read operation of table 1002-i at the address defined by the value carried by the second field of the switch agent command cell.

Step 1320, processor 1160 performs a read operation of table 1002-i at the address which is determined by the first routing label carried by the third field of the switch agent command cell. This read operation returns a X value.

Step 1330, processor performs a logical OR of the value X of step 1320 with the value returned by step 1310. This logical OR results in the addition of the ports that misses in the unicast configuration, The result of the OR operation is then loaded into table 1002 at the address SRH_Connection.

Step 1340, processor 1160 performs a read operation of Table 1020-i at the address defined by the value carried by the second field of the switch agent command cell.

Step 1350, processor 1160 performs a Read operation of Table 1020-i at the address which is determined by the first routing label carried by the third field of the switch agent command cell. This returns a value X.

Step 1360, a logical OR is performed between the value Y returned in step 1350 and that returned in step 1340 and the result of the OR operation is stored into Table 1020-i at the address that is defined by the second SRH_Connection field carried by the switch agent command message.

Steps 1310 to 1360 are executed for any ports so that all the sixteen tables 1002 and 1020 can be updated (step 1370). In the case where the switch agent command message has a third field that comprises more than one routing label, e.g. label 2 and label 3, the preceding procedure is performed again for all the remaining labels (step 1380). For instance, for the second label appearing in the third field, the procedure will be the following:

Processor 1160 performs a read operation of table 1002-i at the address defined by the value carried by the second field of the switch agent command cell (step 1310). Then processor 1160 performs a read operation of table 1002-i at the address which is determined by the second routing label carried by the third field of the switch agent command cell (step 1320). This read operation returns a X value. A logical OR between the two values can then be performed and the result can be loaded into table 1002-i at the address SRH-Connection.

The update of table 1020-i can then be executed, by performing a logical OR of the value extracted at the address defined by the address SR_Connection and the value extracted at the address defined by the second routing label. The result can then be loaded into table 1020-i at the address SRH-Connection.

The processing of the second routing label proceeds then with the update of all the other tables 1002 and 1020. It should be noticed that the skilled man may advantageously loop the steps 1320 and 1330 in order to directly update the table 1002-i, before initiating the update process of table 1020-i. However such details of implementation will depend of the particular context and processor being actually used.

This algorithm appears particularly efficient as it allows the switch agent—being generally located in one Protocol Engine of the switching system—to update the different routing tables of the switch core 1130 without being aware of the internal topology of the switch. The logical OR operations permit to easily add output ports to an unicast configuration which the switch agent does not need to know.

It should be noticed that the updating process that was described before can be executed for any new connections that is required by the switch agent. Whenever a new connection is requested, the update of the routing tables 1002 and 1020 can be easily achieved by a simple transfer of a switch agent command cell via the normal data path using a simple connection cable.

The Functional Operations that are Involved in the Deletion Process of One Label in a SRH Connection.

The principle is to search the particular value of i for which, in Table 1020-i at the address defined by the considered label, the valid bit appears to be set on. At this location, the contents of Table 1020-i, that is to say the bit map is kept as a value X. In the next step, a read operation is performed in this Table (1020-i) at the address defined by the particular value of SRH_connection to get the bit map therein loaded (i.e. Y). Then, an AND operation is performed between Y and the inverted value of X. The result Z is stored again at the address that was defined by the SRH_connection field. If the above result Z is different from zero (thus implying that there still remains a unicast label on this SRH_connection), so the bit map must be kept to a state ON. Table 1002-i remains unaffected.

However, when the value of Z appears to be equal to zero (thus implying that the delete operation was performed on the last label forming the SRH_connection), then the valid bit corresponding to the particular SRH_connection being processed is set to OFF. Additionally, since the last Protocol Engine has to disappear, all the different tables 1002-i (with i=0 to 15) will be updated in order to suppress the output port (corresponding to the latter Protocol Engine) at the address SRH_Connection. In the case where the resulting bit map is equal to zero, then an additional step is performed in order to set the 1 valid bit to zero.

Similarly than for the creation process, the delete operation appears very simple since it does not require that switch agent be aware of the precise topology of the switching system.

Figure 14:
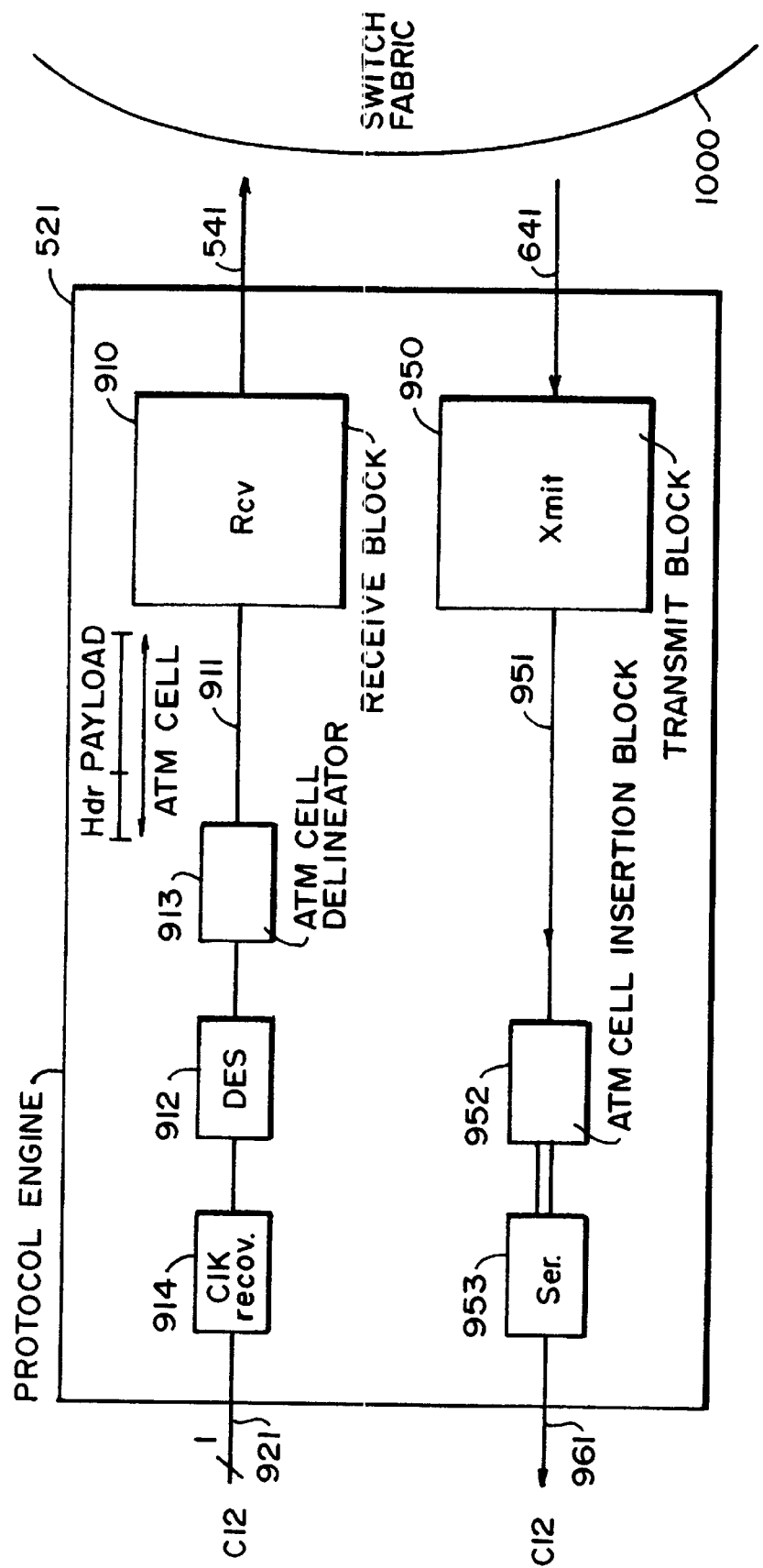
FIG. 14 shows the structure of a Protocol Engine well suited for interfacing lines carrying ATM Cells.

With respect to FIG. 14, there is shown a particular embodiment of an enhanced "Protocol Engine" component that is well suited for interfacing lines carrying ATM cells. As shown in the figure, Protocol Engine 521 is based on a receive process block 910 for managing the ATM incoming flow and for preparing the latter for the attachment to the SCAL 1000. Receive block 910 has an input which is connected to 2-byte bus 911 and an output which is connected to a similar bus, namely bus 541. Conversely, Xmit process 950 receives the routed cells from bus 641 and provides with the ATM cells on bus 951. In the example shown in the figure, the PE provides with the attachment to one OC12/STM4 line. As known by the skilled man, such an attachment involves the use of traditional functions such as clock recovery 914, deserializing 912 and ATM cell delineation 913 so as to convert the physical one-bit data flow on lead 921 into a 16 bit ATM cells on bus 911. It should be noticed that such functions involved well known circuitry—traditionally used in line interfaces—and will not be described with more detail. Conversely, the transmit path involves the Xblock 950 providing ATM cells on a 16-bit bus 951 that will be transmit to the one-bit physical media on lead 961 via a block 952 and a serializer 953. Block 952 provides for the insertion of the ATM cells into the Synchronous, Digital Hierarchy (S.D.H.) bit stream.

Figure 15:
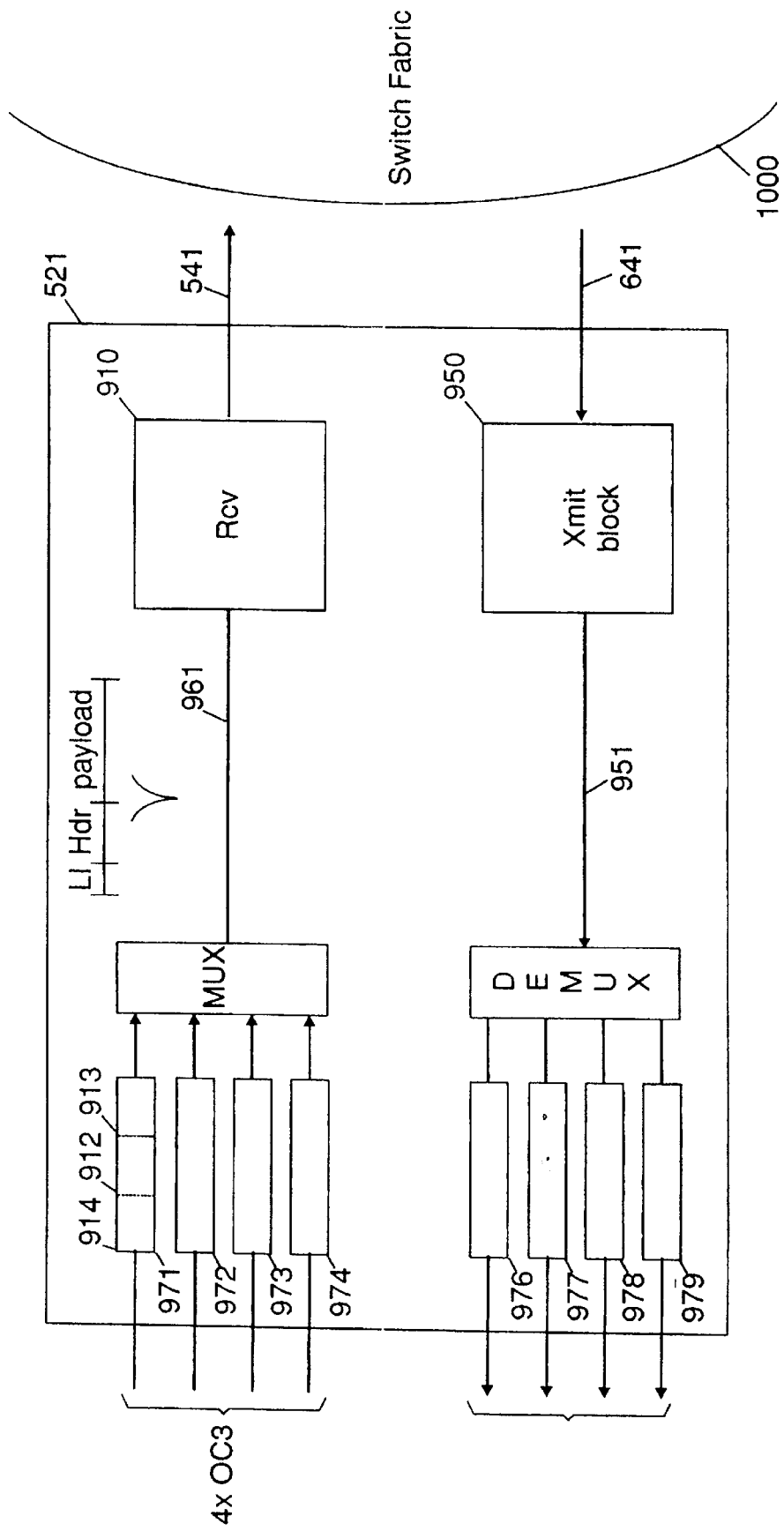
FIG. 15 shows a structure that is adapted for the attachment of four lines OC3 line interfaces via a set of four receive line interfaces 971–974 and four transmit line interfaces 976–979.

With respect to FIG. 15, there is shown a similar structure that is adapted for the attachment of four lines OC3 line interfaces via a set of four receive line interfaces 971–974 and four transmit line interfaces 976–979. For instance, receive line interface 971 comprises circuits 914, 912 and 913 of FIG. 15 and transmit line interface 976 may comprise circuits 952 and 953 of FIG. 15. With respect to the receive part, the output of the four blocks 971–974 are multiplexed at the cell level before the cells are generated on bus 911. Similarly, the flow of cells that is produced by Xmit block 950 is demultiplexed at the cell levels so as to produce the four train of cells which are transmitted to the appropriate OC3 line interface. In one embodiment of the invention the format of the cell that is received by receiver 910 may comprise three field: a first one-byte field that defines the accurate line on which the current cell was received, a second field comprising the 5-bytes ATM header, and a third field comprising the ATM payload. However, it should be noticed that other embodiments may take profit of the so-called level_2 UTOPIA interface which provides the ATM layer the capability of controlling several line interfaces. Such techniques are well known to the skilled man and will not be further described. If this case, the cell received by receiver 910 may only comprise the ATM cell (i.e. the header and the payload) and the information defining the associated line is provided to receiver 910 by means of a separate way (not shown).

Figure 16:
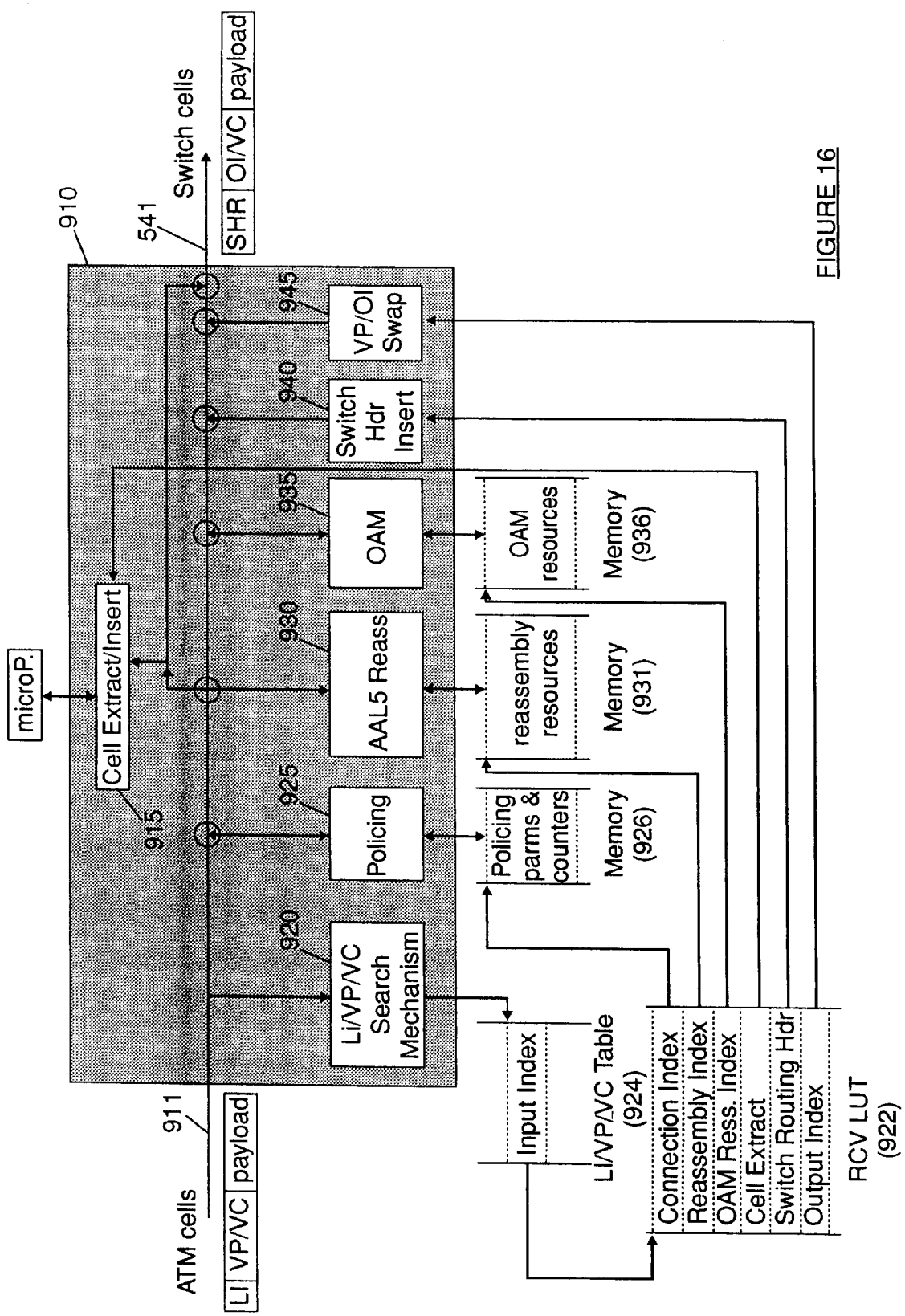
FIG. 16 shows the receive part of Block 910 of the ATM Protocol Engine.

With respect to FIG. 16 there is shown the detailed structure 1 of receive block 910. Basically, block 910 is based on a pipeline structure that successively performs elementary operations in order to convert the cell appearing on bus 911 into a switch cell on bus 541 that will be handled by the corresponding PINT element of the locally attached SCAL 1000.

Firstly, receiver 910 comprises a Search block 920 that receives the cell on lead 911 uses the LI/VP/VC field in order to access a LI/VP/VC table 924 for providing an input index. The access mechanism of such a table is well known and may advantageously use for instance the teaching of European Patent Application 94909050.0 assigned to IBM Corp. (filed Feb. 25, 1994, Luijten, et al, inventor) showing an effective solution when a great number of different addresses (for instance 16000) are required. In the particular case where the LI/VP/VC appears to be not included into table 924, block 920 causes the cell to be discarded so that the latter will not be processed by the remaining part of the receiver block 910. In the case where an input index is associated to the particular LI/VP/VC value being carried by the cell, the input is used for accessing a second table; namely, a RECEIVE Look Up Table 922 which is organized in order to contain, for each input index, a set of additional indexes which will be needed for the remaining part of the processing used by receiver 910.

More particularly, Table 922 is organized to contain the following fields:

A CONNECTION Index, a REASSEMBLY Index, an OPERATION AND MAINTENANCE (OAM) Index, a CELL EXTRACT Index, the SWITCH ROUTING HEADER that will be used by the switch fabric and particularly by the PINT element, and the switch core, and an OUTPUT index that will be used in conjunction with the transmit block 950.

When block 920 completes its processing, the cell is processed by a POLICING block 925 which checks the conformance of the cell regarding the traffic parameters which have been defined for the particular ATM cell connection to which the considered cell belongs. To achieve this, block 925 uses the CONNECTION index returned by the access to table 922, in order to access a POLICING and PARAMETERS COUNTERS table 926 in order to check the incoming cell. Block 925 may check the conformance of the cell to the Generic Cell Rate Algorithm (GCRA) that is well known to the skilled man and recommended by the International Telecommunication Union (I.T.U.). Should non conformance to the GCRA algorithm be detected, then the cell may be discarded in accordance with the above mentioned recommendation.

After the conformance processing performed by block 925, the cell is received by AAL5 block 930 which uses the REASSEMBLY index provided by table 924 for determining whether the cell which is currently received should be directly forwarded to the next block 935, or reassembled in accordance with the well known AAL5 format. In the latter case, AAL5 block 930 causes the payload being transported in the cell to be loaded into a (not shown) buffer. It should be noticed that since the storage capacity is limited, the number of reassembling operations which can be simultaneously performed is also limited.

When the full message is available into this memory, the latter may be accessed by the control processor that is located within the Protocol Engine.

If the cell is not to be reassembled, block 930 lets the latter to be processed by an OAM block 935. The latter uses the OAM RESOURCES index in order to determine or not whether the received cell belongs to a connection (defined by the VP/VC) for which a decision if OAM performance monitoring as specified in the I, 610 ITU Recommendations was made. If the cell is not under OAM performance monitoring, then blocks 935 lets the cell to be processed by the next block 940. In the reverse case, however, block 935 determines whether or not a particular OAM cell is to be inserted or extracted, depending upon the actual number of user cells which were already received or transmitted according to the case. For instance, in the case of cell insertion, block 935 determines the opportunity of inserting an additional OAM cell (having a specific VP/VC) in accordance with the actual number of cells belonging to the considered connection which were already transmitted since the last OAM cell insertion. In the case of cell extraction, conversely, block 935 achieves the extraction of the AOM cell that is received. It should be noticed that, since the receiver block 910 is based on a pipeline device, the insertion mechanism is actually performed at the first empty cell slot within the pipeline. This is made possible since the receive block 910 is designed so as to operate slightly faster than the accurate data throughput of the lines which are thereto attached, thus ensuring the existence of sufficient empty cell slots within the cell flow. Additionally, an independent CELL EXTRACT/INSERT block 915 is fitted for the control processor inside the receiver block 910 so that the latter may also perform extraction in accordance with the contents of the CELL EXTRACT field, or insert a cell when appropriate.

When block 935 completes its process, the cell is received by SWITCH HEADER INSERT block 940 which uses the SWITCH ROUTING HEADER that was read from the access to table 922, and appends the latter to the cell being received before it is transmitted to VP/OI swap block 945. The latter uses the contents of the OUTPUT Index that will be inserted within the cell in lieu of the eight LSB of the VP, plus the Header Correction Code (H.E.C.) field. As will be shown hereinafter with more details, the latter will be used by the transmit part of the protocol engine for establishing the final VP/VC that will be required at the output of the PE.

In other embodiments of the invention, the OI field may also be transmitted as a separate field which may be located at the first location of the cells. It should be noticed that the OUTPUT index is characteristic of a specific process that is involved in the destination Protocol Engine. Therefore it may happen that two distinctive connections may use a same output index. This achieves the possibility of realizing simple multipoint to point connections.

From the above described mechanisms, the SCAL 1000 receives a switch cell on bus 541 that takes the form shown in the figure. A substantial advantage resulting from the structure of receiver 910 comes from the arrangement of the different tables into Memory and the organization in pipeline which permits each blocks 920, 925, 930, 935, 940, 945 to perform an elementary operation prior to the processing made by the block that follows in the path. This permits to ensure that the whole receiving process be achieved in a limited period, what appears essential for high speed lines.

Figure 17:
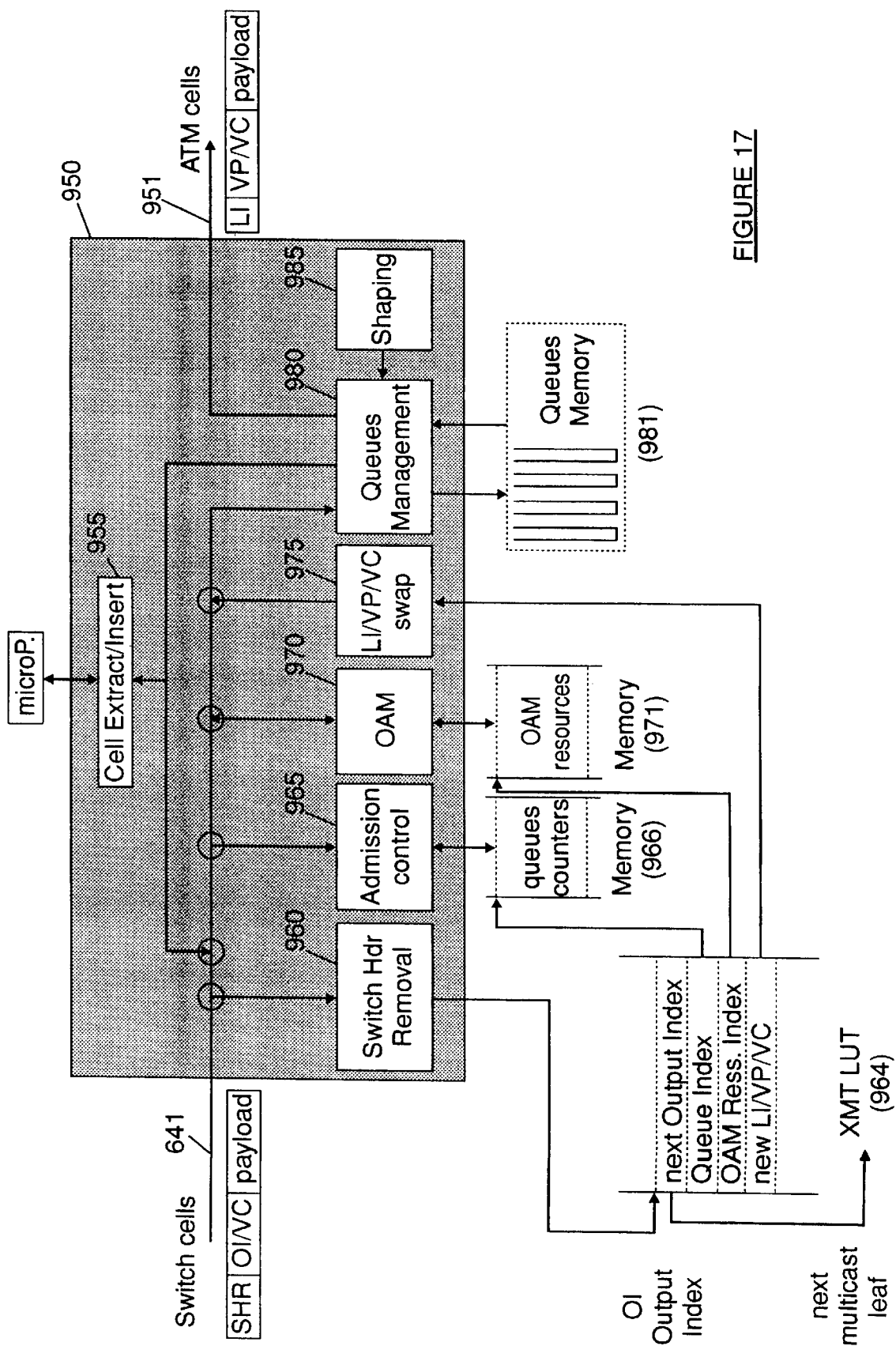
FIG. 17 illustrates the transmit part of Block 950 of the ATM Protocol Engine.

The transmit part 950 is shown in FIG. 17. The switch cell that is received from the SCAL 1000 is entered into the Xmit part and processed by a block 960 that performs the suppression of the SRH from the cell. Additionally, block 960 uses the OUTPUT index that is located within the cell for accessing a XMIT Look Up table 964 which is so arranged as to provide the following field corresponding to the OUTPUT index being considered: a NEXT_OUTPUT Index that will be used for performing multicast operations with respect to ATM connections, a QUEUE Index, a OAM RESOURCE index and a NEW LI/VP/VC that will be used for reestablishing the cell in the state where it was received by receiver 910.

The cell is then processed by a ADMISSION CONTROL module 965 which checks the state of the queue that is associated to the particular connection corresponding to the cell being processed. Indeed, in the preferred embodiment of the invention, transmitter block 950 is designed for handling at least 16000 queues. When block 965 receives the cell, the QUEUE index is used for determining which queue is associated to the considered cell, and particularly for addressing a storate 966 which contains some parameters relating to this queue. Such parameters may include the number of cells being loaded into the queue, or the number of cells which could be loaded into the considered queue because of overload conditions. From these parameters, block 965 may decide or not to cause the loading of the processed cell into the queue that is associated to the considered Queue Index. In a preferred embodiment of the invention, there is used a particular mechanism that monitors the current number of cells being loaded within the queue, and comparing this value to a predefined threshold. Should the former exceeding the latter, than block 965 may either reject any additional cells, or in some restricted cases, accept additional cells when they correspond to priority connections.

Parallel with the loading of the cell into the appropriate queue, a LI/VP/VC block 975 performs the construction of a new header for cell. This is achieved by suppression the OI/VC from the cell being received and superseding it with the contents provided by the NEW_LI/VP/VC. It should be noticed that this construction may leave the VC field unchanged, in which case, a VP switching is performed. More generally however, the whole VP/VC field may change.

In addition to the arrangement of the 16000 queues used in the Xmit block 950, a QUEUE Management system is provided for ensuring to maintain an ordered list of buffers in which the cells are loaded, each ordered list corresponding to one of the 16000 queue. Additionally, a Shaping device 985 causes a smooth output of the cells which are loaded into the different queues. This particularly depends upon the output rate which is allocated to each queue.

Similarly to the receive block 910, a OAM block 970 is used for inserting or extracting OAM performance monitoring cells. If the cell is not under OAM performance monitoring, then blocks 970 does not operate. In the reverse case, however, block 970 determines, as above, whether or not a particular OAM cell is to be inserted or extracted, depending upon the actual number of user cells which were already received or transmitted according to the case.

As mentioned above for the receiver block 910, the invention takes advantage of the particular arrangement of the different tables that are used for managing the different indexes. This permits to prevent the use of large and costly memories. This very effective organization provides with a receiver and a transmit block for an ATM Protocol Engine that allows 600 Mbits/s connections.

It appears from above, that the PE is used for performing the VP/VC swap by means of the additional output index which is embedded into the payload of the switch cell which is routed by the switch core. Without this particular feature, it would be necessary to perform the VP/VC swapping at the level of the PE receiver, thus resulting in a duplication of the cell prior to its routing by the switch core. With this very effective mechanism used in the PE of the present invention, only one cell is routed through the switch core—thus minimizing the overload of the switch core—, and the VO/VC swap is performed at the level of the Protocol Engine on the Xmit side before the cell is transmitted on the line. Thus, the use of the OUTPUT INDEX which is introduced by the receiver part of the Protocol engine is advantageously combined with the efficiency of the switch core that was described above.

Additionally, the mechanism could still be enhanced by using the OUTPUT index for a second function, that provides with the possibility of multicasting cells on connection. This is made possible by combining a multicast buffer with an additional mechanism that is based on the use of a specific bit of NEXT_OUTPUT index field that is produced by the access to table 964. Such mechanism is particularly well described in U.S. Pat. No. 6,101,187 issued on Aug. 8, 2000, to Cukier et al, and incorporated herein by reference.

What is claimed is:

1. Asynchronous Transfer Mode (A.T.M.) Protocol Adapter for a cell switching system comprising a receive part based on a pipeline structure comprising the following elements that successively perform the following operations in order to convert a cell being received from an ATM line adapter into a cell comprising a routing header and a payload;

means (920) receiving the cell comprising a LI/VP/VC field, with LI defining from which line the cell entered into the Protocol Adapter, and VP/VC defining the ATM Virtual Path and Virtual Circuit assigned to the connection to which the cell belong;

means (920) for accessing a first table (924) in order to generate an input index used for addressing a second table (922) returning the following parameters assigned to the considered LI/VP/VC: Connection Index, a REASSEMBLY index; an OPERATION AND MAINTENANCE (OAM) index, a CELL EXTRACT index, a SWITCH ROUTING HEADER (S.R.H.) index used for controlling both the routing process and multicast operations that will be executed into the switching system; and an OUTPUT Index characterizing a specific operation which is to be performed in the destination Protocol Adapter that will receive the cell after it is routed throughout the switching system;

means (Policing block 925) using said CONNECTION index for addressing a third table (POLICY AND PARAMETERS COUNTERS table 936), that permits to check the conformance of the incoming cell to the Generic Cell Rate Algorithm (GCRA);

means (AAL5 block 930) for) using said REASSEMBLY index for determining whether the current cell should be reassembled in accordance with the AAL5 format and performed reassembly; or should be directly forward to the next pipeline element without any reassembly;

means (OAM block 935) using said OAM index for, determining whether the received cell belongs to a connection for which a decision of OAM performance monitoring as specified in the I.610 ITU Recommendation was made, and performed related OAM performance monitoring operations;

means (SWITH HEADER INSERT block 940) for appending a SRH index to the cell being processed by said receive pipeline circuit, said SRH index being using for both controlling the routing mechanism within the switching system and the different multicast operations therein involved;

means (VP/OI swap block 945) for inserting said OUTPUT index within the cell in lieu of bits of said VP field and a Header Correction Code (H.E.C.) field.

2. ATM Protocol Adapter as defined in claim 1 further comprising a transmit part based on a pipeline structure comprising the following elements:

means (block 960) for removing said SRH index included into the received cell, and further using said OUTPUT index for addressing a fourth table (Xmit Look-up table 964) which is so arranged as to provide the following fields: a NEXT_OUTPUT Index for performing multicast operations in the ATM Protocol Adapter; a QUEUE Index, a OAM RESSOURCE Index and a NEW_LI/VP/VC index;

means (ADMISSION CONTROL Module 965) for checking the state of the queue being associated to a particular connection corresponding to the cell being processed in order to prevent said queue to be overloaded, means (LI/VP/VC block 975) for constructing a hew header for the cell being processed by replacing said OI/VC field with said NEW_LI/VP/VC;

queues management means (980) for maintaining an orderred list of buffers in which the cells are being loaded, each order list corresponding to one among the different queues involved in said Protocol Adapter.

means (OAM block 970) for inserting or extracting OPERATION AND MAINTENANCE (O.A.M.) perrformance monitoring cells.

3. ATM Protocol Adapter as defined in claim 2 where said queue checking means (965) involves monitoring the current number of cells being loaded within said queue, and comparing this value to a predefined threshold, and, should the value exceed said threshold, accepting only cells belonging to priority connections.

4. ATM Protocol adapter as defined in claim 1 for performing multipoint to point connections when several connections received on different receive part (910) share the same OUTPUT index in one single or in multiple Transmit part (950).

5. ATM Protocol adapter as defined in anyone of claims 1 to 3 characterized in that one unique queue in transmit part (950) is shared by multiple connections having different OUTPUT index in order to achieve trunking.

* * * * *